US012429567B2

(12) United States Patent
Takano et al.

(10) Patent No.: US 12,429,567 B2
(45) Date of Patent: Sep. 30, 2025

(54) DISTANCE-MEASURING IMAGING DEVICE

(71) Applicant: Nuvoton Technology Corporation Japan, Kyoto (JP)

(72) Inventors: Haruka Takano, Osaka (JP); Toru Yamada, Kyoto (JP); Masahiko Nishimoto, Kyoto (JP); Seiji Nakamura, Osaka (JP); Mayu Nishikawa, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 805 days.

(21) Appl. No.: 17/748,695

(22) Filed: May 19, 2022

(65) Prior Publication Data

US 2022/0276358 A1 Sep. 1, 2022

Related U.S. Application Data

(63) Continuation of application No. PCT/JP2020/044071, filed on Nov. 26, 2020.
(Continued)

(51) Int. Cl.
*G01S 7/487* (2006.01)
*G01S 7/486* (2020.01)
(Continued)

(52) U.S. Cl.
CPC .......... *G01S 7/4876* (2013.01); *G01S 7/4868* (2013.01); *G01S 7/489* (2013.01); *G01S 17/894* (2020.01)

(58) Field of Classification Search
None
See application file for complete search history.

(56) References Cited

U.S. PATENT DOCUMENTS

2008/0205708 A1*  8/2008  Masuda ................ G01S 7/491
                                                382/106
2008/0205709 A1*  8/2008  Masuda ................ G01S 7/491
                                                382/106
(Continued)

FOREIGN PATENT DOCUMENTS

CN       110456369 A      11/2019
DE    102016201599 A1      8/2017
(Continued)

OTHER PUBLICATIONS

Chinese Office Action dated Apr. 30, 2025 issued in the corresponding Chinese Patent Application No. 202080081588.1, with English translation of Search Report.
(Continued)

*Primary Examiner* — Eric L Bolda
(74) *Attorney, Agent, or Firm* — Rimon P.C.

(57) ABSTRACT

A drive controller in a distance-measuring imaging device generates an exposure control signal having first to third exposure control pulses based on output timings of corresponding ones of emission control pulses. The difference between output starting time of the third exposure control pulse and output starting time of one of the emission control pulses is greater than the difference between output starting time of the second exposure control pulse and output starting time of one of the emission control pulses. The difference between output starting time of the second exposure control pulse and output starting time of one of the emission control pulses is greater than the difference between output starting of the first exposure control pulse and output starting time of one of the emission control pulses. The imager outputs first to third exposure signals indicating amounts of charge generated through exposure by the first to third control pulses.

19 Claims, 18 Drawing Sheets

Related U.S. Application Data

(60) Provisional application No. 62/941,436, filed on Nov. 27, 2019.

(51) Int. Cl.
  *G01S 7/489* (2006.01)
  *G01S 17/894* (2020.01)

(56) References Cited

U.S. PATENT DOCUMENTS

| | | | |
|---|---|---|---|
| 2008/0231831 A1* | 9/2008 | Masuda | G01S 7/493 356/5.1 |
| 2009/0079959 A1* | 3/2009 | Masuda | G01S 7/493 356/5.1 |
| 2018/0156899 A1 | 6/2018 | Yamada et al. | |
| 2019/0007592 A1 | 1/2019 | Otani et al. | |
| 2020/0110177 A1 | 4/2020 | Kamisada et al. | |

FOREIGN PATENT DOCUMENTS

| | | |
|---|---|---|
| JP | 2020-056698 A | 4/2020 |
| WO | 2017/022219 A1 | 2/2017 |
| WO | 2017/150246 A1 | 9/2017 |

OTHER PUBLICATIONS

International Search Report issued on Feb. 9, 2021 in International Patent Application No. PCT/JP2020/044071, with English translation.

\* cited by examiner

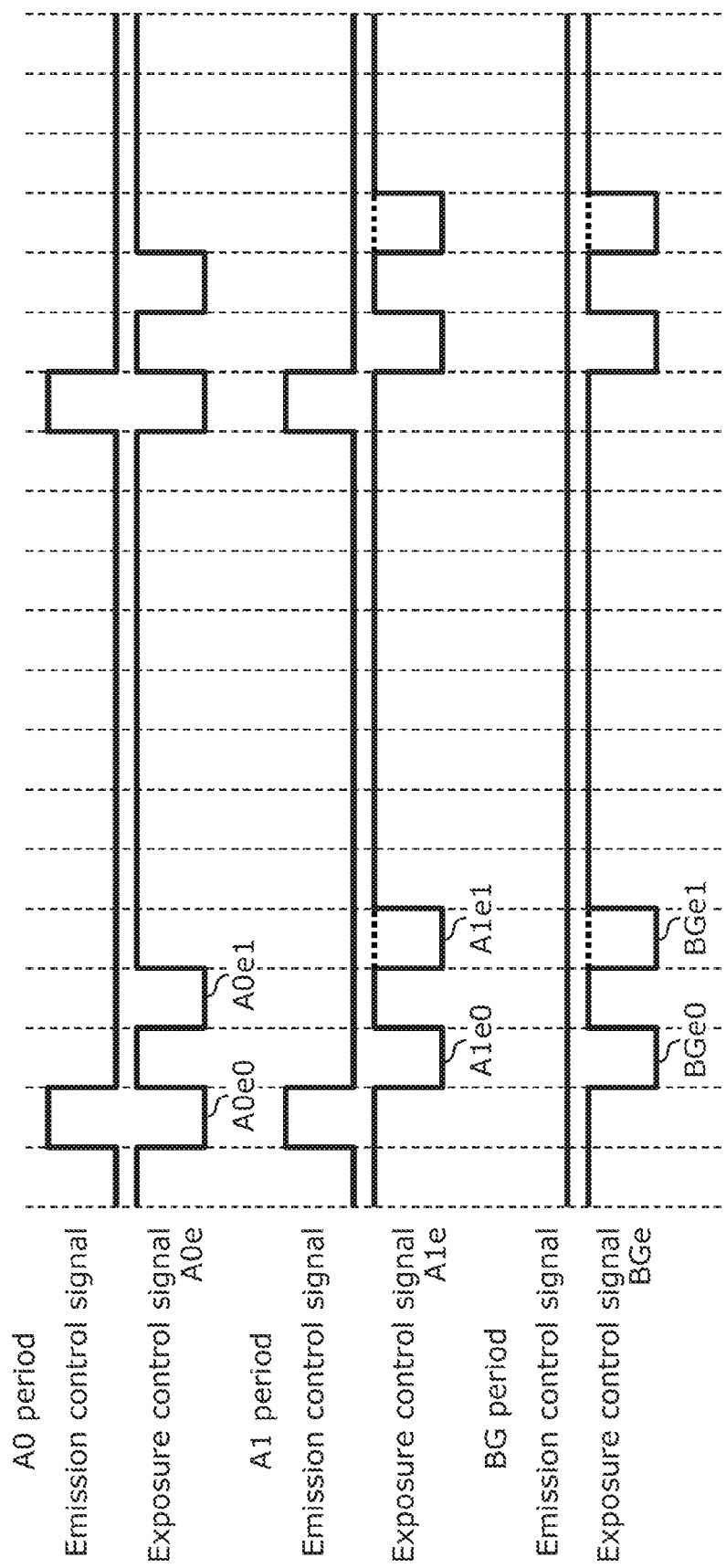

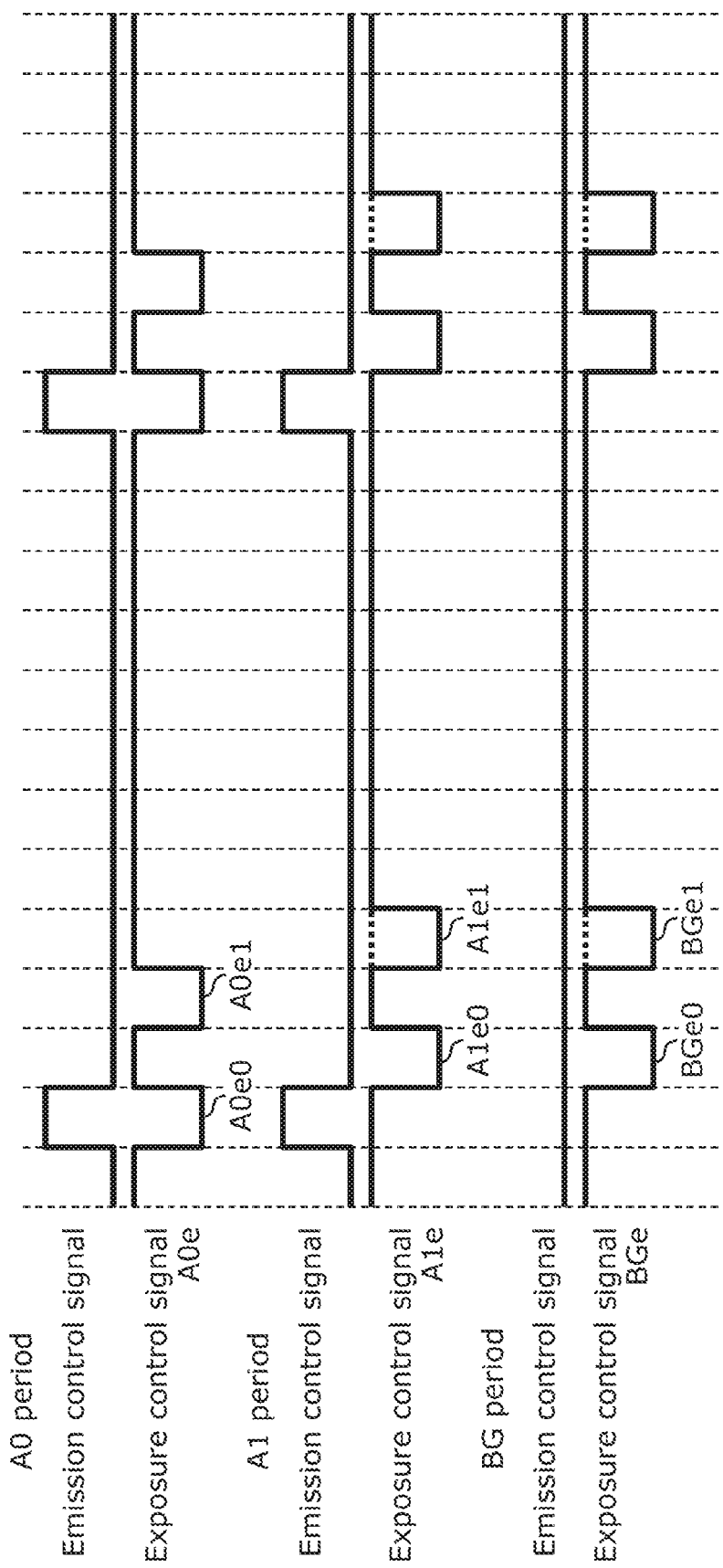

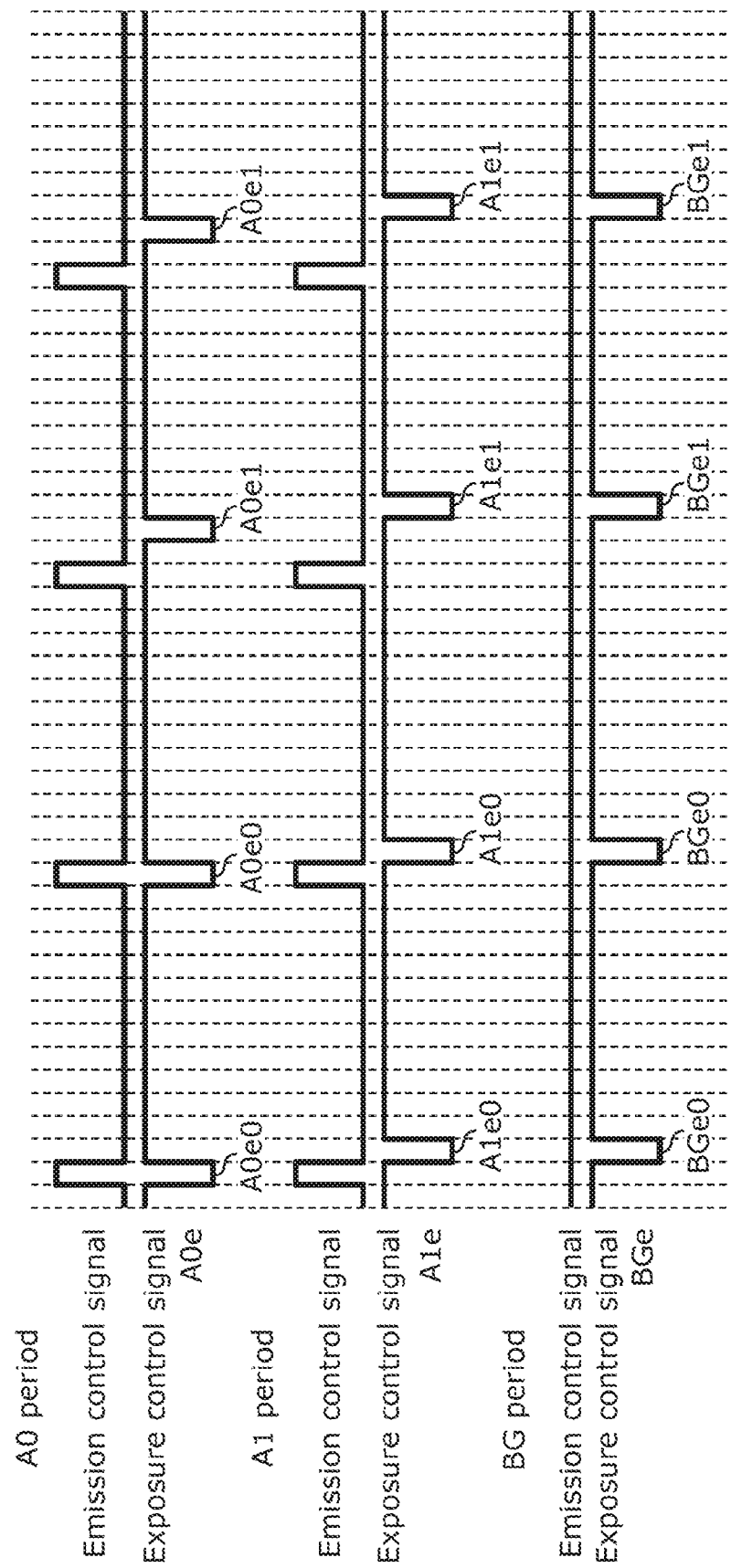

FIG. 13A

Pixel identification signal: H
Pixel identification signal: L

FIG. 13B

Pixel identification signal: H
Pixel identification signal: L

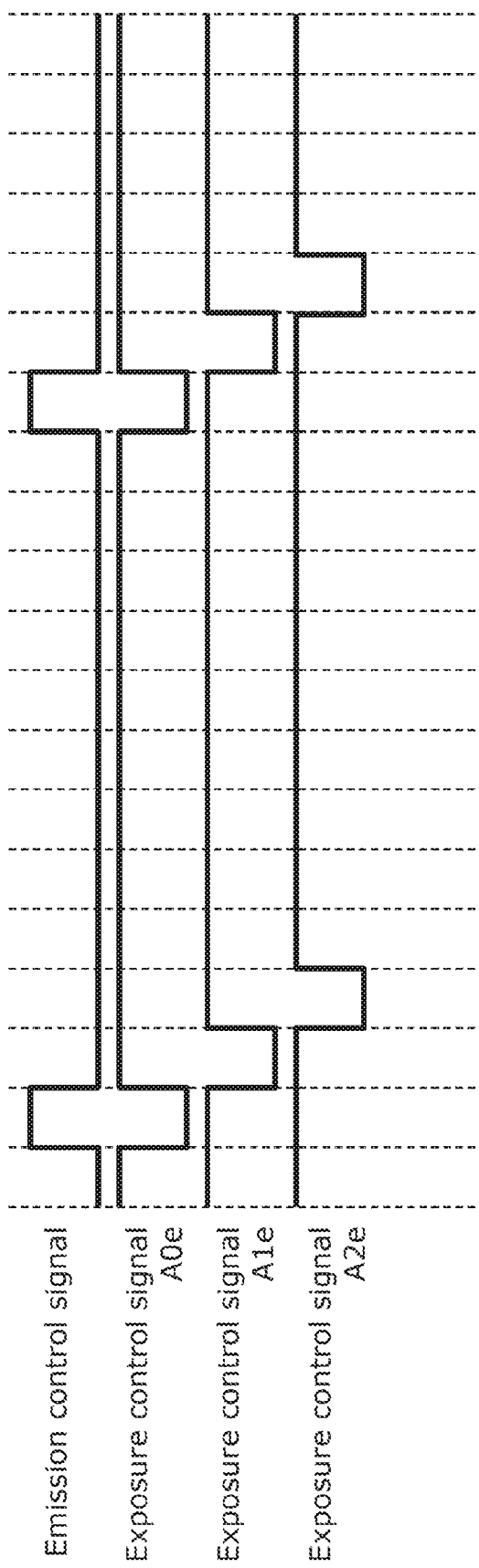

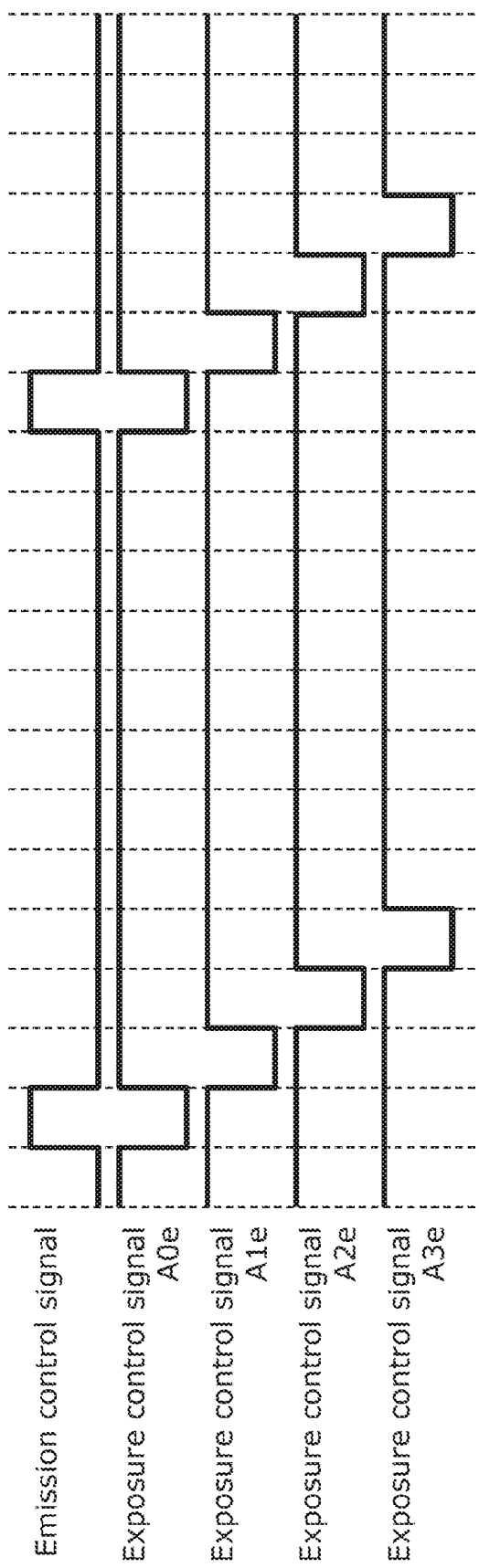

DISTANCE-MEASURING IMAGING DEVICE

CROSS REFERENCE TO RELATED APPLICATIONS

This is a continuation application of PCT International Application No. PCT/3P2020/044071 filed on Nov. 26, 2020, designating the United States of America, which is based on and claims priority of U.S. Provisional Patent Application No. 62/941,436 filed on Nov. 27, 2019, The entire disclosures of the above-identified applications, including the specifications, drawings and claims are incorporated herein by reference in theft entirety.

FIELD

The present disclosure relates to a distance-measuring imaging device.

BACKGROUND

Patent Literature 1 discloses a distance-measuring imaging device which measures a distance to a target object by emitting pulsed light and receiving reflected light from the target object.

CITATION LIST

Patent Literature

PTL 1: PCT International Publication No. 2017/150246

SUMMARY

Technical Problem

According to conventional techniques, there is a problem that distance measurement accuracy is decreased in multipath environments in which not only light directly reflected from a target object but also light indirectly reflected from the target object are included.

The present disclosure provides a distance-measuring imaging device which reduces decrease in distance measurement accuracy in multipath environments.

Solution to Problem

A distance-measuring imaging device according to an aspect of the present disclosure is a distance-measuring imaging device which emits pulsed light, receives reflected light from a target object, and measures a distance to the target object. The distance-measuring imaging device includes: a drive controller which outputs (i) an emission control signal having one or more emission control pulses each of which instructs emission of light and (ii) one or more exposure control signals each having one or more exposure control pulses each of which instructs exposure; a light source which emits the pulsed light to coincide with an output timing of each of the one or more emission control pulses; an imager which executes exposure to receive reflected light resulting from the pulsed light emitted being reflected by the target object, to coincide with an output timing of each of the one or more exposure control pulses, and outputs a corresponding one of the one or more exposure signals each indicating an amount of signal charge generated through exposure; and a calculator which receives the exposure signal as an input, performs distance calculation, and outputs a distance image. The drive controller generates an exposure control signal which has a first exposure control pulse, a second exposure control pulse, and a third exposure control pulse which are included in the one or more exposure control pulses, Each of the first exposure control pulse, the second exposure control pulse, and the third exposure control pulse is based on the output timing of a corresponding emission control pulse as a reference and included in the one or more emission control pulses. A time difference between a point of time at which output of the third exposure control pulse is started and a point of time at which output of one of the one or more emission control pulses is started is greater than a time difference between a point of time at which output of the second exposure control pulse is started and a point of time at which output of one of the one or more emission control pulses is started. A time difference between a point of time at which output of the second exposure control pulse is started and a point of time at which output of one of the one or more emission control pulses is started is greater than a time difference between a point of time at which output of the first exposure control pulse is started and a point of time at which output of one of the one or more emission control pulses is started. The imager outputs a first exposure signal indicating an amount of signal charge generated through exposure by the first exposure control pulse, a second exposure signal indicating an amount of signal charge generated through exposure by the second exposure control pulse, and a third exposure signal indicating an amount of signal charge generated through exposure by the third exposure control pulse.

Advantageous Effects

The distance-measuring imaging device according to the present disclosure makes it possible to reduce decrease in distance measurement accuracy in multipath environments.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 23 is a timing chart indicating another example of signal waveforms of the emission control signal and an exposure control signal generated by the distance-measuring imaging device according to Embodiment 1.

FIG. 3 is a diagram indicating an example of signal waveforms of the emission control signal and the exposure control signal in FIG. 2A, in an A0 period, an A1 period, and a BG period.

FIG. 7 is a diagram indicating, regarding Frame A, the signal waveforms of an emission control signal and the exposure control signal in FIG. 6A in an A0 period, an A1 period, and a BG period according to Embodiment 2.

FIG. 12 is a timing chart indicating another drive performed by each of the distance-measuring imaging device according to Embodiment 1 and the distance-measuring imaging device according to Embodiment 2. The timing chart indicates other outputs in an A0 period, an A1 period, and a BG period.

FIG. 13A is an explanatory diagram indicating pixel identification signals generated in each of the distance-measuring imaging devices according to the embodiments.

FIG. 13B is an explanatory diagram indicating pixel identification signals generated in each of the distance-measuring imaging devices according to the embodiments.

FIG. 14 is a timing chart indicating a drive performed by each of the distance-measuring imaging device according to Embodiment 1 and the distance-measuring imaging device according to Embodiment 2.

FIG. 15 is a timing chart indicating another drive by each of the distance-measuring imaging device according to Embodiment 1 and the distance-measuring imaging device according to Embodiment 2.

DESCRIPTION OF EMBODIMENTS

Figure 1:
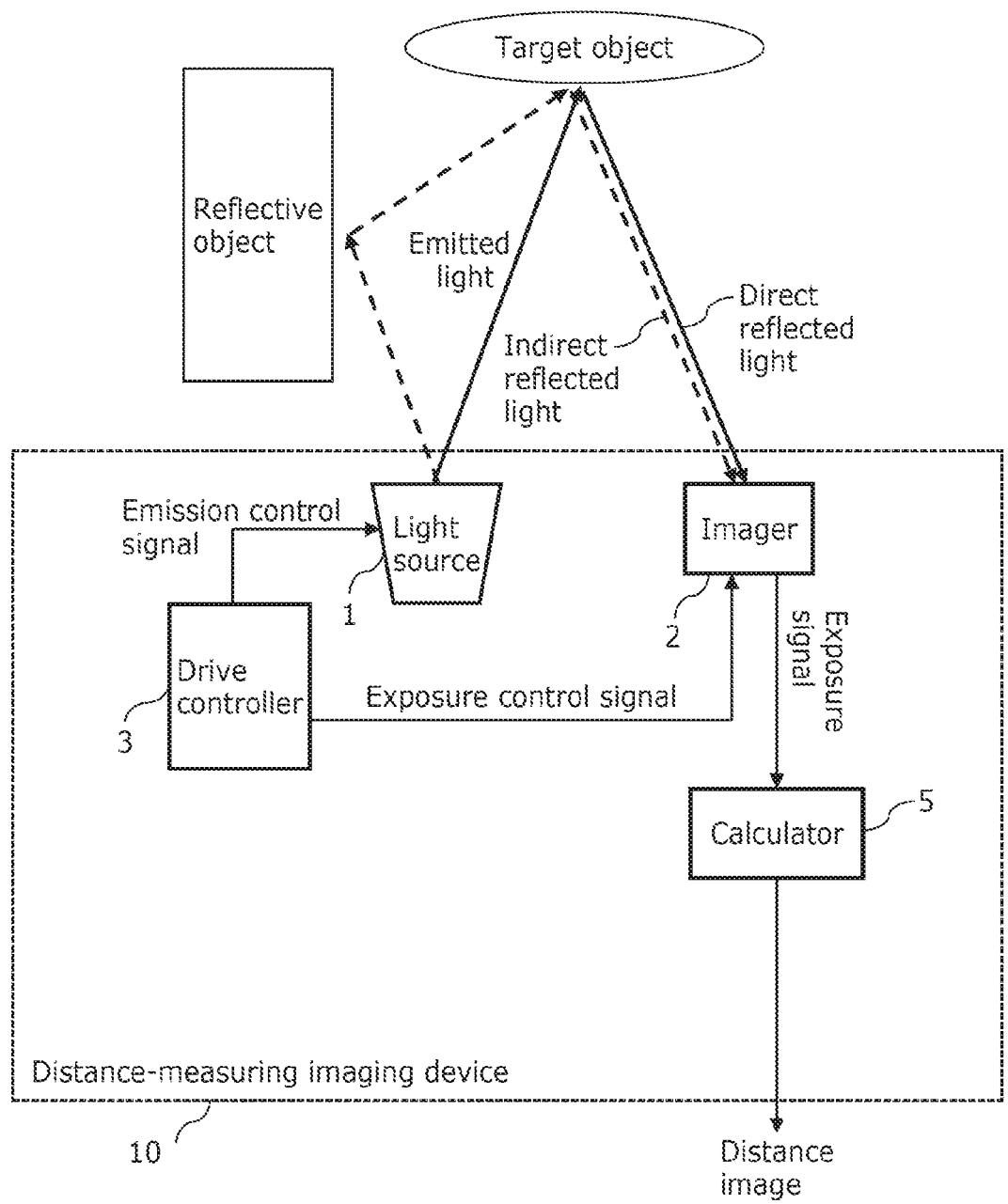
FIG. 1 is a block diagram illustrating an example of a structure of a distance-measuring imaging device according to Embodiment 1.

Underlying Knowledge Forming Basis of the Present Disclosure

The Inventors have found that the distance-measuring imaging device described in the "Background" section entails the problem indicated below.

In a conventional TOF distance-measuring scheme, light emitted from a light source normally spreads at an angle in a range from 20 degrees to 150 degrees. Reflective objects such as walls, a ceiling, obstacles, etc., are present near a target object and a distance-measuring imaging device, part of the emitted and spread light passes through reflective objects and is reflected on the target object, and returns as indirectly reflected light to the distance-measuring imaging device. As a result, reflected light observed by the distance-measuring imaging device includes both strong directly reflected light and weak indirectly reflected light, and exposure is performed using the reflected light. The indirectly reflected light has a flight distance longer than a flight distance of the directly reflected light, and thus returns to the distance-measuring imaging device with a delay from a point of time at which the directly reflected light returns. At this time, due to the co-presence of the indirectly reflected light, the distance observed between the distance-measuring imaging device and the target object is inevitably longer than the actual distance derived by the directly reflected light. In this way, in a multipath environment, there is a problem that the indirectly reflected light becomes a cause of a measurement error, and the distance that is measured becomes longer than the actual distance.

In order to solve such a problem, a distance-measuring imaging device according to an aspect of the present disclosure is a distance-measuring imaging device which emits pulsed light, receives reflected light from a target object, and measures a distance to the target object. The distance-measuring imaging device includes: a drive controller which outputs (i) an emission control signal having one or more emission control pukes each of which instructs emission of light and (ii) one or more exposure control signals each having one or more exposure control pukes each of which instructs exposure; a light source which emits the pulsed light to coincide with an output timing of each of the one or more emission control pulses; an imager which executes exposure to receive reflected light resulting from the pulsed light emitted being reflected by the target object, to coincide with an output timing of each of the one or more exposure control pukes, and outputs a corresponding one of the one or more exposure signals each indicating an amount of signal charge generated through exposure; and a calculator which receives the exposure signal as an input, performs distance calculation, and outputs a distance image. The drive controller generates an exposure control signal which has a first exposure control puke, a second exposure control puke, and a third exposure control puke which are included in the one or more exposure control pukes. Each of the first exposure control puke, the second exposure control puke, and the third exposure control pulse is based on the output timing of a corresponding emission control puke as a reference and included in the one or more emission control pukes. A time difference between a point of time at which output of the third exposure control puke is started and a point of time at which output of one of the one or more emission control pukes is started is greater than a time difference between a point of time at which output of the second exposure control puke is started and a point of time at which output of one of the one or more emission control pukes is started. A time difference between a point of time at which output of the second exposure control puke is started and a point of time at which output of one of the one or more emission control pukes is started is greater than a time difference between a point of time at which output of the first exposure control puke is started and a point of time at which output of one of the one or more emission control pukes is started. The imager outputs a first exposure signal indicating an amount of signal charge generated through exposure by the first exposure control puke, a second exposure signal indicating an amount of signal charge generated through exposure by the second exposure control pulse, and a third exposure signal indicating an amount of signal charge generated through exposure by the third exposure control puke.

In this way, in a predefined distance-measuring range, the first exposure signal and the second exposure signal can mainly include signal charge corresponding to the indirectly reflected light, and the third exposure signal can mainly include signal charge corresponding to the indirectly reflected light. Thus, the distance-measuring imaging device is capable of reducing decrease in distance measurement accuracy in a multipath environment by calculating the distance using not only the first exposure signal and the second exposure signal but also the third exposure signal.

For example, the calculator may output distance information, based on a ratio of the amount of signal charge of the second exposure signal to a total of the amount of signal charge of the first exposure signal, the amount of signal charge of the second exposure signal, and the amount of signal charge of the third exposure signal.

In this way, it is possible to easily calculate the distance information with a reduced decrease in distance measurement accuracy, based on the ratio to the total.

For example, the drive controller may generate the first exposure control puke and the third exposure control puke, based on a common emission control puke which is one of the one or more emission control pulses.

In this way, it is possible to obtain the first exposure signal and the third exposure signal by executing exposure twice per one-time light emission. At that time, it is possible to obtain signal charge of the indirectly reflected light using the third exposure signal.

For example, the drive controller may: generate the first exposure control puke, based on a first emission control pulse included in the one or more emission control pukes; generate the second exposure control puke, based on a second emission control puke included in the one or more emission control pukes; and generate the third exposure control pulse, based on a third emission control puke included in the one or more emission control pukes.

In this way, it is possible to obtain the first exposure signal by executing exposure once per one-time light emission. Likewise, it is possible to obtain the second exposure signal by executing exposure once per one-time light emission. In addition, it is possible to obtain the third exposure signal by executing exposure once per one-time light emission. In this way, it is possible to obtain the first exposure signal, the second exposure signal, and the third exposure signal by performing simple control of executing exposure once per one-time light emission. The third exposure signal mainly includes signal charge corresponding to the indirectly reflected light, which makes it possible to reduce reduction in distance measurement accuracy in the multipath environment.

For example, the exposure control signal may have a fourth exposure control puke. A time difference between a point of time at which output of the fourth exposure control puke is started and a point of time at which output of an emission control puke which is the reference and is included in the one or more emission control pukes is started may be greater than a time difference between a point of time at which output of the third exposure control puke is started and a point of time at which output of an emission control pulse which is the reference and is included in the one or more emission control pulses is started. The drive controller may: generate the first exposure control pulse and the third exposure control pulse, based on a common emission control pulse which is one of the one or more emission control pulses; and generate the second exposure control pulse and the fourth exposure control pulse, based on a common emission control pulse which is one of the one or more emission control pulses.

In this way, it is possible to obtain the first exposure signal and the third exposure signal by executing exposure twice per one-time light emission. Likewise, it is possible to obtain the second exposure signal and a fourth exposure signal by executing exposure once per one-time light emission. The same control sequence of executing exposure twice per one-time light emission is used for the operation for obtaining the first exposure signal and the third exposure signal and also for the operation for obtaining the second exposure signal and the fourth exposure signal. Thus, in the above two operations, for example, no significant difference in variation of power supply voltage is made. Therefore, it is possible to further reduce decrease in distance measurement accuracy.

For example, the calculator may output distance information, based on a ratio of a second total to a first total. The first total is a sum of the amount of signal charge of the first exposure signal, the amount of signal charge of the second exposure signal, the amount of signal charge of the third exposure signal, and an amount of signal charge of the fourth exposure signal, and the second total is a sum of the amount of signal charge of the second exposure signal and the amount of signal charge of the fourth exposure signal.

In this way, it is possible to obtain the distance information with a reduced decrease in distance measurement accuracy, using the first exposure signal, the second exposure signal, the third exposure signal, and the fourth exposure signal.

For example, the calculator may output distance information, based on a ratio of the amount of signal charge of the second exposure signal to a total of the amount of signal charge of the first exposure signal, the amount of signal charge of the second exposure signal, the amount of signal charge of the third exposure signal, and an amount of signal charge of the fourth exposure signal.

In this way, it is possible to use the amount of signal charge of the second exposure signal instead of a second total which is a sum of the amount of signal charge of the second exposure signal and the amount of signal charge of the fourth exposure signal. Also in this way, it is possible to obtain the distance information with a reduced decrease in distance measurement accuracy.

For example, the drive controller may: receive, as an input, an identification signal that specifies any one of a plurality of operation modes including a first operation mode and a second operation mode; control distance measurement by a first operation when the identification signal specifies the first operation mode, the first operation using the exposure control signal which has the first exposure control pulse, the second control pulse, and the third control pulse; and control distance measurement by a second operation different from the first operation when the identification signal specifies the second operation mode.

In this way, since the distance measurement is performed in each of the first operation mode and the second operation mode, it is possible to select distance information with a smaller measurement error.

For example, the distance-measuring imaging device may further include a distance image generator which: generate a multipath detection signal indicating whether multipath is present, based on first distance information obtained through the first operation and second distance information obtained through the second operation; and output the multipath detection signal indicating a magnitude of an error included in one of the first distance information and the second distance information, based on a difference between the first distance information and the second distance information.

In this way, it is possible to detect whether multipath is present or absent, and detect the magnitude of an error due to multipath.

For example, the distance-measuring imaging device may further include a distance image generator which generates a multipath detection signal indicating whether multipath is present, based on first distance information obtained through the first operation and second distance information obtained through the second operation.

In this way, it is possible to detect whether multipath is present or absent.

For example, the distance-measuring imaging device may further include: a distance image generator which outputs a multipath detection signal indicating a magnitude of an error included in one of first distance information obtained through the first operation and second distance information obtained through the second operation, based on a difference between the first distance information and the second distance information.

In this way, it is possible to detect the magnitude of the error due to multipath.

For example, in the second operation mode, the drive controller may generate an exposure control signal which has a first pulse and a second pulse as the exposure control pulse. A time difference between a point of time at which output of the second pulse is started and a point of time at which output of one of the one or more emission control pulses is started may be greater than a time difference between a point of time at which output of the first pulse is started and a point of time at which output of the one of the one or more emission control pulses is started.

In this way, the second operation mode may be for, for example, a distance-measuring operation similar to the conventional distance-measuring operation.

For example, the imager may output a former exposure signal indicating an amount of signal charge generated through exposure by the first pulse and a latter exposure signal indicating an amount of signal charge generated through exposure by the second pulse.

In this way, in the second operation mode, it is possible to calculate the distance based on the former exposure signal and the latter exposure signal.

For example, the calculator may output distance information, based on a ratio of the amount of signal charge of the latter exposure signal to a total of the amount of signal charge of the former exposure signal and the amount of signal charge of the latter exposure signal.

In this way, in the second operation mode, the distance information is calculated based on the ratio. It is possible to derive the distance information with a reduced decrease in distance measurement accuracy by combining the second operation mode and the first operation mode.

For example, the distance-measuring imaging device may further include: a distance image generator which generates the distance image, based on a value obtained by adding a distance value indicated by first distance information obtained through the first operation and a distance value indicated by second distance information obtained through the second operation.

In this way, an average may be calculated based on the value obtained by adding the first distance information and the second distance information.

For example, the drive controller may execute exposure a plurality of times. The exposure may be for generating the first exposure control pulse and the third exposure control pulse based on a common emission control pulse which is one of the one or more emission control pulses. In addition, the drive controller may remove one of the first exposure pulse and the third exposure control pulse, a predetermined number of times in the exposure executed the plurality of times.

In this way, it is possible to increase the accuracy in the detection of multipath because a larger amount of indirectly reflected light is used for exposure when removing the first exposure control pulse, the predetermined number of times in the plurality of iterative operations of exposure executed twice per one-time light emission.

For example, the drive controller may execute first exposure a plurality of times. The first exposure may be for generating the first exposure control pulse and the third exposure control pulse based on a common emission control pulse which is one of the one or more emission control pulses. In addition, the drive controller may execute second exposure a plurality of times. The second exposure may be for generating the second exposure control pulse and the fourth exposure control pulse based on a common emission control pulse which is one of the one or more emission control pulses. In addition, the drive controller may remove one of the first exposure control pulse and the third exposure control pulse, a predetermined number of times in the first exposure executed the plurality of times, and remove one of the second exposure control pulse and the fourth exposure control pulse, a predetermined number of times in the second exposure executed the plurality of times.

In this way, it is possible to increase the distance measurement accuracy because the load of drive controller 3 which generates exposure control pulses is reduced when removing the first exposure control pulse and the second exposure control pulse, the predetermined numbers of times in the plurality of iterative operations of exposure executed twice per one-time light emission, and a steeper exposure control pulse is supplied.

For example, the drive controller may generate the emission control signal so that a duty ratio corresponding to an emitted-light pulse cycle becomes 33% or below.

In this way, it is possible to make the pulsed light to have a high strength to the background light, and to increase light resistance which is a distance measurement performance.

For example, the calculator may calculate distance information using a time-of-flight (TOF) principle, and outputs the distance information.

In this way, the distance information using the TOF principle is output.

It is to be noted that these general and specific aspects may be implemented using a system, a method, an integrated circuit, or a computer program, or any combination of systems, methods, integrated circuits, or computer programs.

Hereinafter, embodiments are described in detail with reference to the drawings. It is to be noted that each of the embodiments described below indicates a specific example of the present disclosure. The numerical values, shapes, materials, constituent elements, the arrangement and connection of the constituent elements, drive timings, etc. indicated in the following exemplary embodiments are mere examples, and therefore do not limit the scope of the present disclosure. In addition, constituent elements which are not recited in any one of the independent claims that define the most generic concept of the present disclosure among the constituent elements in any one of the embodiments indicated below are described as optional constituent elements. In addition, each of the drawings is not always illustrated precisely. In each of the drawings, overlapping descriptions regarding substantially the same elements are skipped or simplified.

Embodiment 1

FIG. 1 is a block diagram illustrating an example of a structure of distance-measuring imaging device 10 according to Embodiment 1. The same diagram also illustrates a target object and a reflective object other than distance-measuring imaging device 10. The target object is one example of target objects for distance measurement. The reflective object generates indirectly reflected light as one example in a multipath environment. Distance-measuring imaging device 10 calculates, based on the amounts of signals of light generated through exposure in imager 2, time of flight (TOF) of light that is time from when light emitted by light source 1 is directly reflected by the target object and when the directly reflected light returns to imager 2, and derives a distance by multiplying the TOF by an appropriate coefficient. In order to perform such distance measurement, distance-measuring imaging device 10 includes light source 1, imager 2, drive controller 3, and calculator 5.

Light source 1 emits pulsed light to coincide with an output timing of an emission control pulse included in an emission control signal from drive controller 3. The pulsed light is desirably infrared light when there is a human, otherwise the pulsed light may be light other than infrared light.

Imager 2 performs exposure using reflected light from the target object to which the pulsed light has been emitted, to coincide with an output timing of the exposure control pulse, and outputs the exposure signal indicating the amount of signal charge generated through the exposure. Imager 2 includes a solid-state imaging element called an image sensor. Imager 2 performs imaging at a resolution of approximately 20 thousand to 2 million pixels.

Figure 2A:
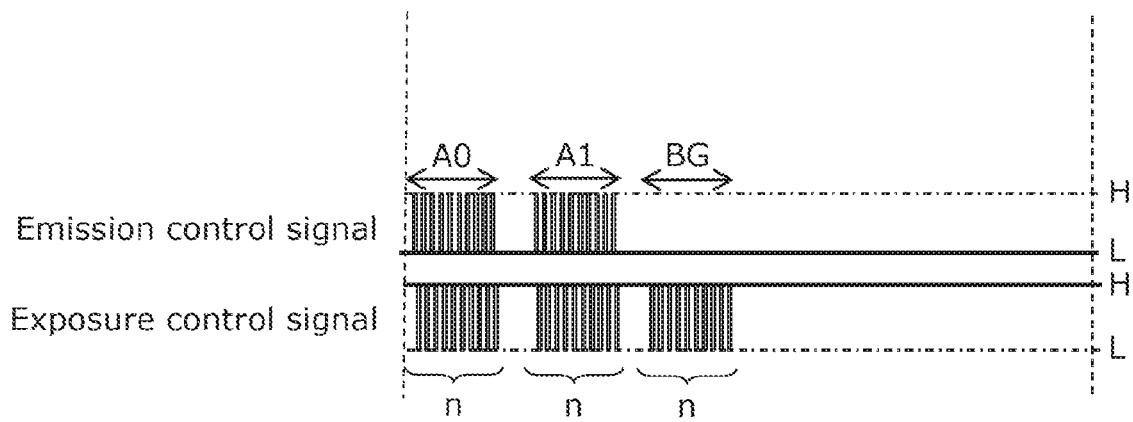
FIG. 2A is a timing chart indicating an example of signal waveforms of an emission control signal and an exposure control signal generated by the distance-measuring imaging device according to Embodiment 1.
Figure 2B:
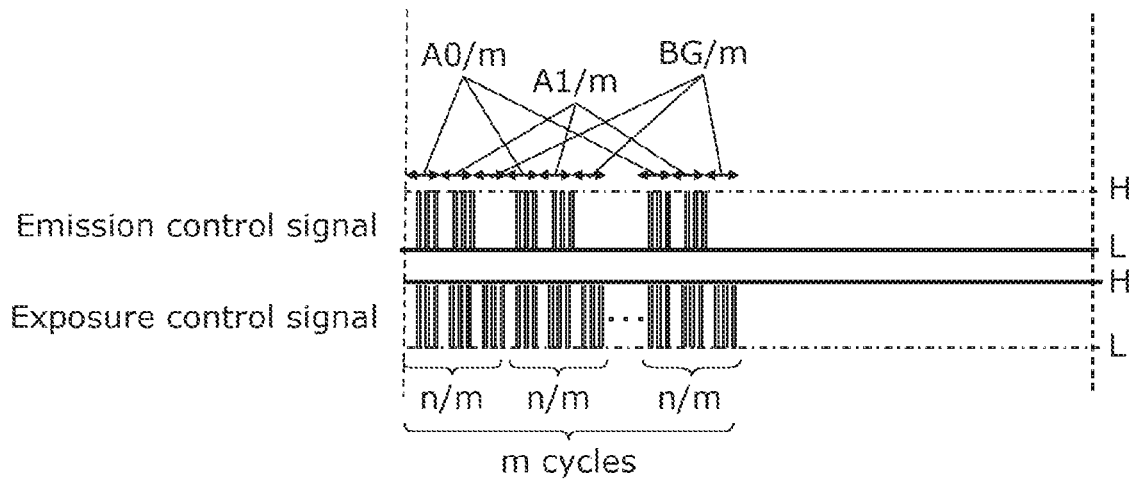

Drive controller 3 outputs the emission control signal including the emission control pulse instructing the timing of light emission, and an exposure control signal including an exposure control pulse instructing a timing of exposure. FIG. 2A is a timing chart indicating an example of signal waveforms of the emission control signal and an exposure control signal generated by distance-measuring imaging device 10 according to Embodiment 1. In the example in FIG. 2A, the emission control signal includes a positive-logic emission control pulse. The emission control pulse causes light source 1 to emit light in the case of a high level. Each exposure control signal includes a negative-logic emission control pulse. The exposure control pulse causes imager 2 to perform exposure in the case of a low level. In the same diagram, an exposure process is performed in each of the A0 period, the A1 period, and the BG period. The timings at which light emission and exposure are combined are different between the A0 period and the A1 period. The BG period is a period in which background light is used for exposure, and only exposure is performed without light emission. In the A0 period, the emission control signal is a signal having an emission control pulse that is repeated n times. Accordingly, the combination of light emission and exposure is repeated n times, N in N times may be any integer of 2 or larger, and N times may be several tens of times to several tens of thousands of times, for instance. This also applies to the emission control signal in the A1 period. It is to be noted that drive controller 3 may generate the emission control signal and the exposure control signal as in FIG. 2B instead of FIG. 2A. In FIG. 2B, a unit process which is repeated n times is not continuous, and a process in which each of a unit process in the A0 period, a unit process in the A1 period, and a unit process in the BG period is performed once is repeated m times (cycles).

Drive controller 3 generates exposure control signals which include a first exposure control pulse, a second exposure control pulse, a third exposure control pulse, and a fourth exposure control pulse each of which is based on an output timing of a corresponding one of the one or more emission control pulses. Here, the time difference between a point of time at which output of the fourth exposure control pulse is started and a point of time at which output of one of the one or more emission control pulses is started is greater than the time difference between a point of time at which output of the third emission control pulse is started and a point of time at which output of one of the one or more emission control pulses is started. The time difference between a point of time at which output of the third exposure control pulse is started and a point of time at which output of one of the one or more emission control pulses is started is greater than the time difference between a point of time at which output of the second emission control pulse is started and a point of time at which output of one of the emission control pulses is started. The time difference between a point of time at which output of the second exposure control pulse is started and a point of time at which output of one of the one or more emission control pulses is started is greater than the time difference between a point of time at which output of the first emission control pulse is started and a point of time at which output of one of the one or more emission control pulses is started. The first exposure control pulse and the third exposure control pulse are included in the unit process in an A0 period. The second exposure control pulse and the fourth exposure control pulse are included in the unit process in an A1 period.

Imager 2 outputs a first exposure signal indicating the amount of signal charge generated through exposure by the first exposure control pulse, a second exposure signal indicating the amount of signal charge generated through exposure by the second exposure control pulse, and a third exposure signal indicating the amount of signal charge generated through exposure by the third exposure control pulse.

Calculator 5 outputs distance information, based on a ratio of a second total to a first total. The first total is a sum of the amount of signal charge of the first exposure signal, the amount of signal charge of the second exposure signal, the amount of signal charge of the third exposure signal, and an amount of signal charge of the fourth exposure signal, and the second total is a sum of the amount of signal charge of the second exposure signal and the amount of signal charge of the fourth exposure signal. In this way, it is possible to reduce decrease in accuracy of distance information due to multipath. The reduction is possible because part of the directly reflected light in the multipath environment is included in the third exposure signal, and thus error is reduced.

In addition, A0 denotes a total of the amount of signal charge of the first exposure signal and the amount of signal charge of the third exposure signal. A1 denotes the amount of signal charge of the second exposure signal, and the amount of signal charge is obtained by repeating the unit process in an A1 period. Calculator 5 calculates distance information according to expression A1/(A0+A1). It is to be noted that the amount of signal charge of A0 and the amount of signal charge of A1 are obtained by subtracting the amount of signal charge of background light denoted as BG obtained in a BG period. The amount of signal charge AU in the expression includes the third exposure signal corresponding to the part of the indirectly reflected light in the present disclosure, it is possible to reduce decrease in accuracy due to multipath compared with the conventional techniques.

It is to be noted that the pulsed light is intermittently emitted infrequently. For example, the duty ratio of emitted pulsed light may be 33% or smaller. In this way, it is possible to make the pulsed light to have a high strength to the background light that comes from sunlight and nearby lighting devices, and to increase light resistance which is a distance measurement performance.

Calculator 5 receives the exposure signal as an input, and outputs distance information by calculating TOF.

Next, descriptions are given of operations performed by distance-measuring imaging device 10 according to Embodiment 1.

FIG. 2A is a timing chart indicating an example of an operation performed by distance-measuring imaging device 10 according to Embodiment 1.

As illustrated in FIG. 2A, drive controller 3 outputs the emission control signal and an exposure control signal, and light source 1 outputs pulsed light when the emission control signal is at the high level.

The order of the exposure periods which are the A0 period, the A1 period, and the BG period may be changed. Alternatively, as in FIG. 2B, each of the exposure periods is shorten to 1/m corresponding to the unit process, and a unit process set of an A0 period/m, an A1 period/m, and a BG period/m may be repeated m times, Here, n is an integer of 2 or larger. Here, m is an integer of 2 or larger and n or smaller. In this case, the time differences between points of time at which outputs of three exposure signals A0, A1, and BG that are used for distance-measuring calculations are started are reduced to 1/m, which provides an effect of being able to perform the distance-measuring calculations even when the target object is moving.

It is to be noted that exposure signals A0 and A1 include BG, and the components obtained by subtracting the BG is the actual amount of signals of the emitted light.

Furthermore, calculator 5 outputs measured distance D per pixel according to the following expression: measured distance D=(A1−BD)/(A0−BG)+(A1−BG). Distance D indicates a normalized distance value in a range from 0 to 1.

FIG. 3 illustrates in detail parts of the outputs of the emission control signal and the exposure control signal in the A0 period, the A1 period, and the BG period in each of FIG. 2A and FIG. 2B.

As the exposure control signals, exposure control signals A0e, A1e, and BGe are output in 3-pattern phase relationships for the emission control signal. In the A0 period and the A1 period, basically two exposure control pulses are output for one emission control pulse. In the BG period, the emission control signal is always at the low level (no emission). Hereinafter, the low level and the high level may be abbreviated as L and H, respectively.

The significant difference from the driving method performed by the conventional distance-measuring imaging device lies in the point that exposure control signal A0e includes two continuous exposure control pulses A0e0 and A0e1, exposure control signal A1e includes two continuous exposure control pulses A1e0 and A1e1, and exposure control signal BGe includes two continuous exposure control pulses BGe0 and BGe1. Exposure control pulse A0e0 is a specific example of the first exposure control pulse. Exposure control pulse A1e0 is a specific example of the second exposure control pulse. Exposure control pulse A0e1 is a specific example of the third exposure control pulse. Exposure control pulse A1e1 is a specific example of the fourth exposure control pulse.

Figure 4:
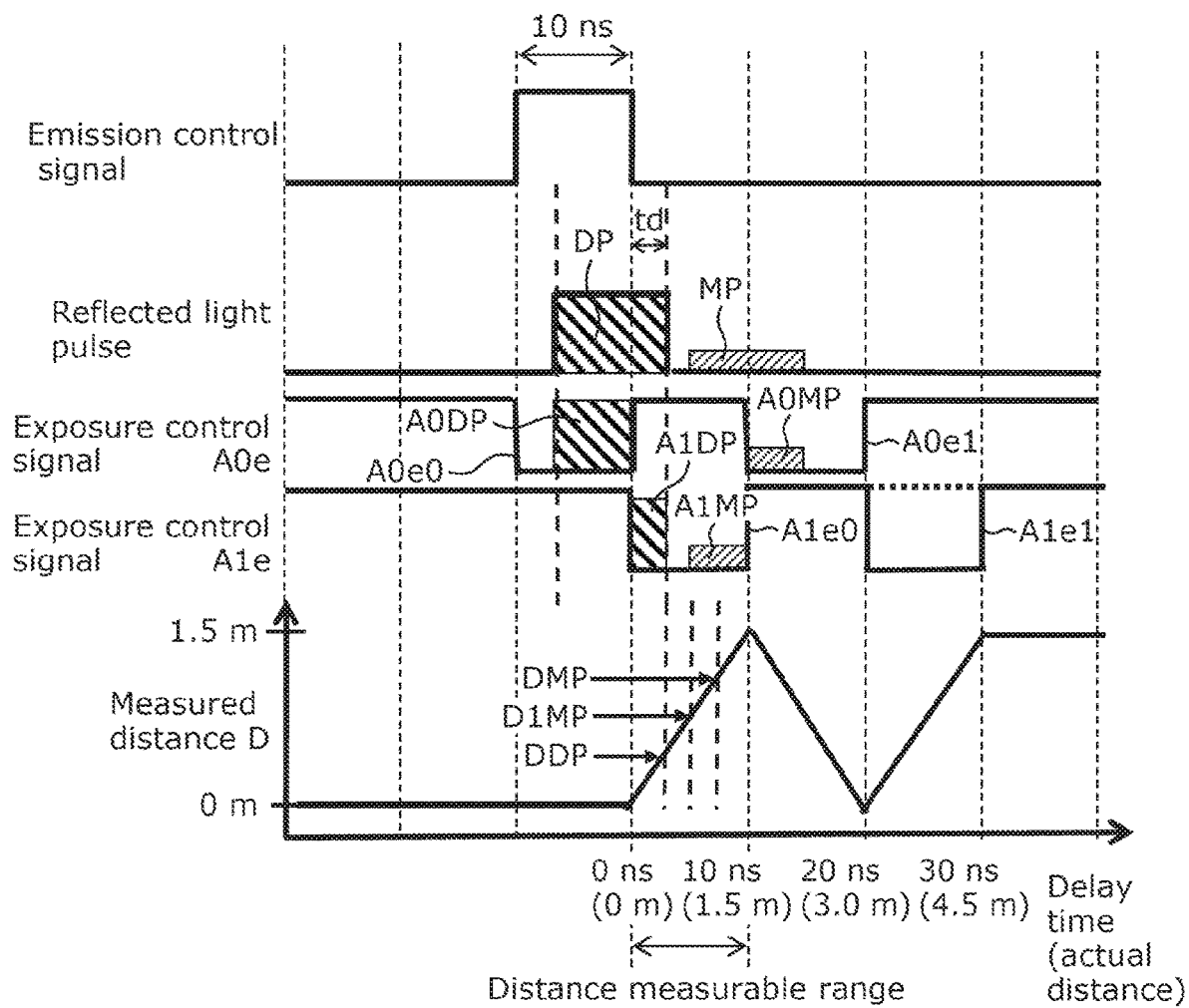
FIG. 4 is a diagram indicating relationships between the emission control signal and exposure control signals generated by the distance-measuring imaging device according to Embodiment 1.

FIG. 4 is a diagram indicating relationships between the emission control signal and the exposure control signal generated by distance-measuring imaging device 10 according to Embodiment 1. FIG. 4 illustrates a case in which a reflective object is present between light source 1 and a target object, not only directly reflected light but also indirectly reflected light are emitted onto imager 2, and a multipath problem occurs. FIG. 4 is a diagram schematically indicates (i) temporal relationships between pulse DP of light directly reflected from the target object, pulse MP of indirectly reflected light, and exposure control signals A0e and A1e, and (ii) relationships between actual distances and measured distances D. For convenience in understanding, FIG. 4 indicates both exposure control signals A0e and A1e. In the A0 period, a unit process in which the emission control signal and exposure control signal A0e are combined is performed. In the A1 period, a unit process in which the emission control signal and exposure control signal A1e are combined is performed. Distance DDP in the diagram indicates an actual distance of the target object in the case where the distance is measured based only on directly reflected light. Distance D1MP indicates an example of a distance measured according to this embodiment when directly reflected light and indirectly reflected light are co-present. Distance DMP indicates an example of a distance measured according to the conventional techniques when directly reflected light and indirectly reflected light are co-present.

The pulse of light emitted from light source 1 branches to directly reflected light DP which is directly reflected on the target object and to indirectly reflected light MP which passes through the nearby reflective object and is reflected on the target object. Directly reflected light DP and indirectly reflected light MP then enter imager 2. At this time, indirectly reflected light MP has time of flight longer than the time of flight of directly reflected light DP by time corresponding to the difference between the round-trip optical lengths of indirectly reflected light MP and directly reflected light DR Furthermore, since indirectly reflected light MP is diffusedly reflected plural times, the light strength decreases.

As for the pulse of directly reflected light DP and the pulse of indirectly reflected light MP, imager 2 measures exposure signal A0DP mainly by directly reflected light DP when first pulse A0e0 of exposure control signal A0e is at the low level (L), and measures exposure signal A0MP mainly by indirectly reflected light MP when second pulse A0e1 of exposure control signal A0e is at L. Furthermore, image 2 also measures exposure signal A1DP by directly reflected light DP and exposure signal A1MP by indirectly reflected light NIP when first pulse A1e0 of exposure control signal A1e is at L.

It is to be noted here that each of A0DP, A0MP, A1DP, and A1MP is the actual exposure signal obtained by subtraction of BG. Based on these exposure signals, measured distance D1MP per pixel in the case where multipath is present is output according to expression (A1DP+A1MP)/[(A0DP+A0MP)+(A1DP+A1MP)].

As for measured distance D1MP, expressions exposure signal A0DP=0 and measured distance D1MP=1 are satisfied when directly reflected light DP flights by the same time as the L period of first pulse A0e0 of exposure control signal A0e, and measured distance D1MP decreases from 1 to 0 again when directly reflected light DP flights over the same time. Accordingly, for example, when the L period of first pulse A0e0 of exposure control signal A0e is 10 nsec., the round-trip flight distance of light in the case where measured distance D1MP is in a range from 0 to 1 becomes approximately 3 m (that is, the speed of light is 3. 0E8 m/s×10 sec), and thus a distance measurable range in Embodiment 1 becomes approximately 1.5 m corresponding to the one way as in a conventional example.

In the distance measuring method according to this embodiment, at the same time as the time at which exposure signal A1MP by indirectly reflected light MP is added to exposure signal A1DP by directly reflected light DP, exposure signal A0MP by indirectly reflected light MP is added to exposure signal A0DP by directly reflected light DR Addition of exposure signal A0MP to A0DP increases the denominator used to calculate measured distance D1MP and allows the target object to be observed closer than in measured distance DMP in the conventional example, which reduces error that is caused in the conventional distance measuring scheme that inevitably makes a target object observed far away due to multipath.

Second pulses A1e1 and BGe1 of exposure control signals A1e and BGe are applied in order to increase calculation accuracy of measured distance D1 by matching the amounts of exposure control signals A0e and BG. However, it is to be noted that such application is not necessary, and it is possible to reduce error in the distance measuring scheme in the conventional example even if second pulses A1e1 and BGe1 are not applied in order to simplify exposure control.

In addition, first pulse A0e0 of exposure control signal A0e is a specific example of the first exposure control pulse, and second pulse A0e1 of exposure control signal A0e is a specific example of the third exposure control pulse. In addition, first pulse A1e0 of exposure control signal A1e is a specific example of the second exposure control pulse, and second pulse A1e1 of exposure control signal A2e is a specific example of the fourth exposure control pulse.

Embodiment 2

In this embodiment, a description is given of distance-measuring imaging device 10A which measures distances in each of the first operation mode and the second operation mode, and obtains the smaller/smallest one of the measured distances by composing the information about the two distances or selecting the information about one of the two distances.

Figure 5:
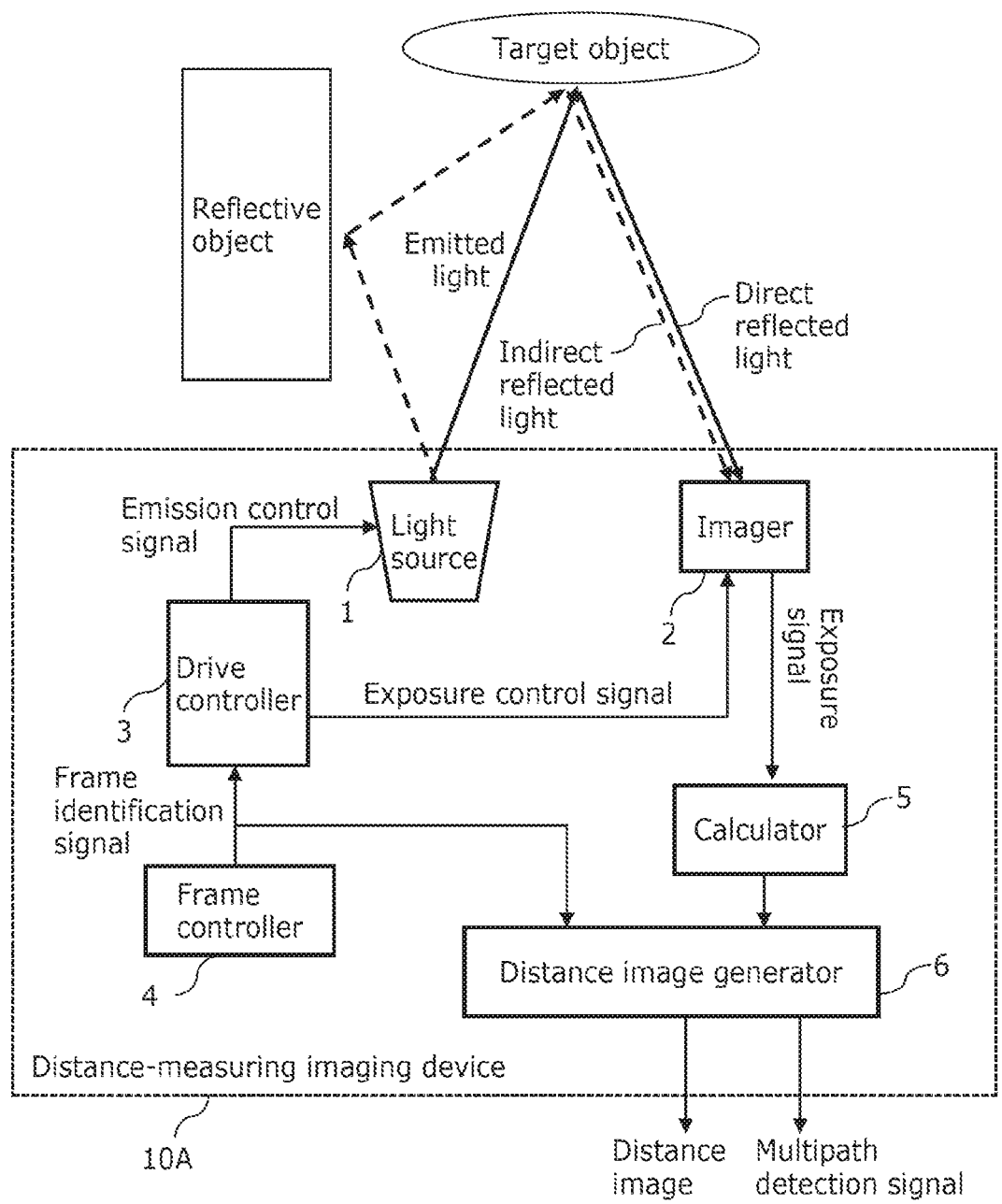
FIG. 5 is a block diagram illustrating an example of a structure of a distance-measuring imaging device according to Embodiment 2.

FIG. 5 is a structural diagram illustrating distance-measuring imaging device 10A according to Embodiment 2.

Distance-measuring imaging device 10A in the diagram is different from distance-measuring imaging device 10 in FIG. 1 in the point of further including frame controller 4 and frame composer (distance image generator) 6. Hereinafter, descriptions are given of focusing on different points.

Frame controller 4 outputs L for the n-th frame and H for the (N+1)-th frame as frame identification signals. The frame corresponding to the frame identification signal of L is referred to as Frame A. The frame corresponding to the frame identification signal of H is referred to as Frame B, In the case of Frame A, the first operation mode that is the same operation as in Embodiment 1 is performed. In the case of Frame B, the second operation mode is performed.

Distance image generator 6 generates distance information with a small distance error by composing the information about the distances measured in the first operation mode and the second operation mode or selecting the information about one of the distances.

It is to be noted that imager 2 outputs, to calculator 5, three kinds of exposure signals (A0DP+A0MP), (A1DP+A1MP), and BG in which exposure signals by indirectly reflected light are superimposed onto exposure signals by directly reflected light. Next, descriptions are given of operations performed by distance-measuring imaging device 10 according to Embodiment 2.

Figure 6A:
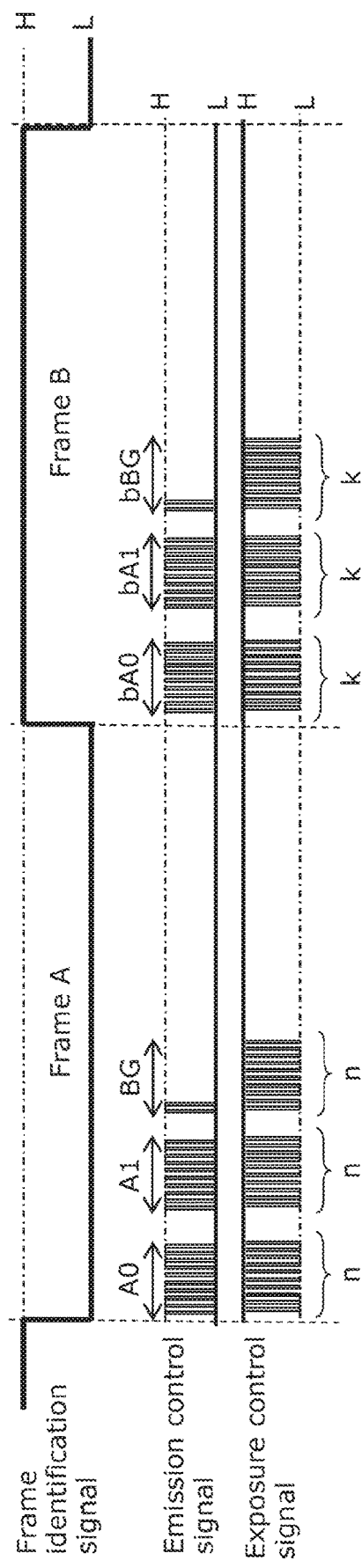
FIG. 6A is a timing chart indicating an example of an operation performed by the distance-measuring imaging device according to Embodiment 2.

As illustrated in FIG. 6A, frame controller 4 outputs L for the n-th frame (Frame A) and H for the (N+1)-th frame (Frame B) as frame identification signals; drive controller 3 receives the frame identification signals as inputs, and outputs an emission control signal and an exposure control signal; and light source 1 emits light when the emission control signal is H.

It is to be noted that L and H of the frame identification signals may be opposite, and the emission control signal has several tens of emission control pulses to several tens of thousands of emission control pulses. Emitted light corresponding to emission control pulses may be pulsed light.

In addition, it is desirable that the pulsed light be light that is emitted intermittently and infrequently. In this way, it is possible to make the emitted light (pulsed light) to have a high strength to BG constant light that comes from sunlight and nearby lighting devices, and to increase light resistance which is a distance measurement performance.

Furthermore, imager 2 includes an image sensor (a solid-state imaging element that performs imaging at a resolution of approximately 20 thousand to 2 million pixels) for example, performs exposure only in a period in which an exposure control signal is L for reflected light that is light obtained when emitted light is reflected on the target object, performs photoelectric conversion of light corresponding to the total sum of exposure in the L period, and outputs exposure signals A0, A1, and BG per pixel.

The order of the exposure periods of exposure signals A0, A1, and BG may be changed. Alternatively, as in FIG. 6B, each of the exposure periods is shorten to 1/m, and a set of an A0 period/m, an A1 period/m, and a BG period/m may be repeated m times. In this case, the time differences between points of time at which outputs of three exposure signals A0, A1, and BG that are used for distance-measuring calculations are started are reduced to 1/m, which provides an effect of being able to perform the distance-measuring calculations even when the target object is moving.

It is to be noted that exposure signals A0 and A1 include BG, and the components obtained by subtracting the BG is the actual amount of signals of the emitted light.

Furthermore, calculator 5 outputs measured distance D per pixel according to the following expression: measured distance D=(A1−BD)/(A0−BG)+(A1−BG).

Furthermore, frame composer 6 multiplies a measured distance of Frame A by a specific coefficient (for example, La=approximately 1500 mm) when expression measured distance of Frame B<threshold value T of measured distance D is approximately 0.3 is satisfied, and outputs the multiplication result as a distance image.

Otherwise, when expression measured distance of Frame B≥threshold value T is satisfied, frame composer 6 multiplies a measured distance of Frame B by a specific coefficient (for example, Lb=approximately 4500 mm), and outputs the multiplication result as a distance image.

In addition, frame composer 6 outputs, as a multipath detection signal, the difference between the result of multiplying the measured distance of Frame A by specific coefficient La and the result of multiplying the measured distance of Frame B by specific coefficient Lb.

Figure 6B:
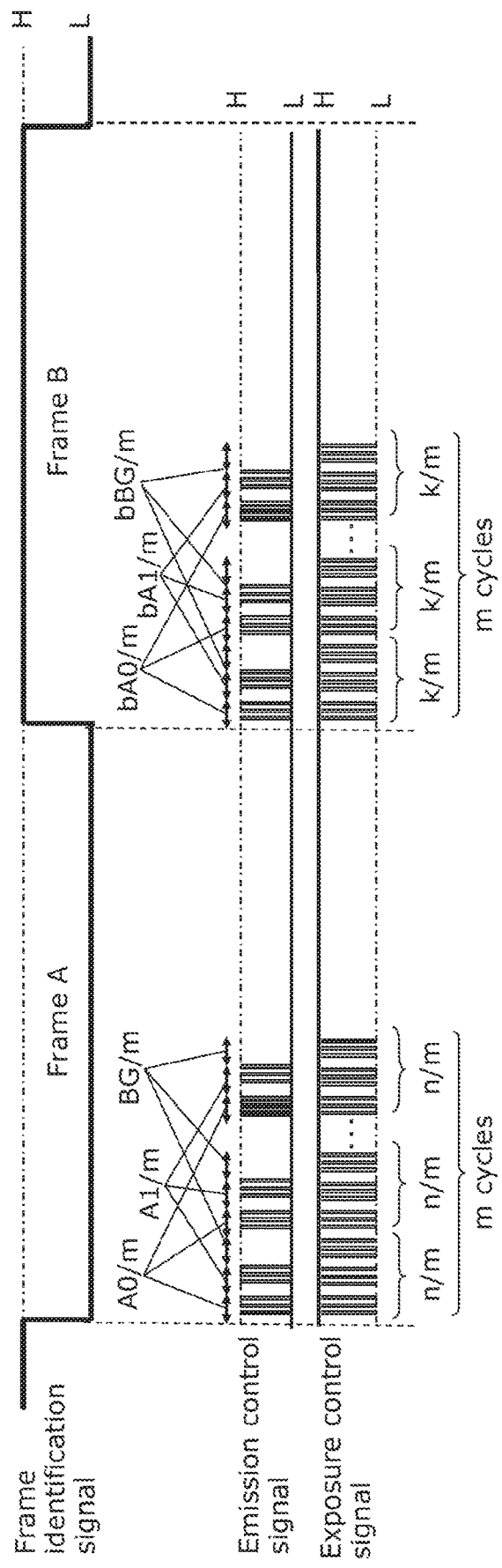
FIG. 6B is a timing chart indicating another example of an operation performed by the distance-measuring imaging device according to Embodiment 2.

FIG. 7 illustrates in detail parts of the outputs of the emission control signal and the exposure control signal in the A0 period, the A1 period, and the BG period in each of FIG. 6A and FIG. 6B.

As the exposure control signals, exposure control signals A0e, A1e, and BGe are output in 3-pattern phase relationships for the emission control signal. In the A0 period and the A1 period, basically two exposure control pulses are output for one emission control pulse. The emission control signal in the BG period is always L (no emission).

The significant difference from the driving method performed by the conventional distance-measuring imaging device lies in the point that exposure control signal A0e includes two continuous exposure control pulses A0e0 and A0e1, exposure control signal A1e includes two continuous exposure control pulses A1e0 and A1e1, and exposure control signal BGe includes two continuous exposure control pulses BGe0 and BGe1.

Figure 8:
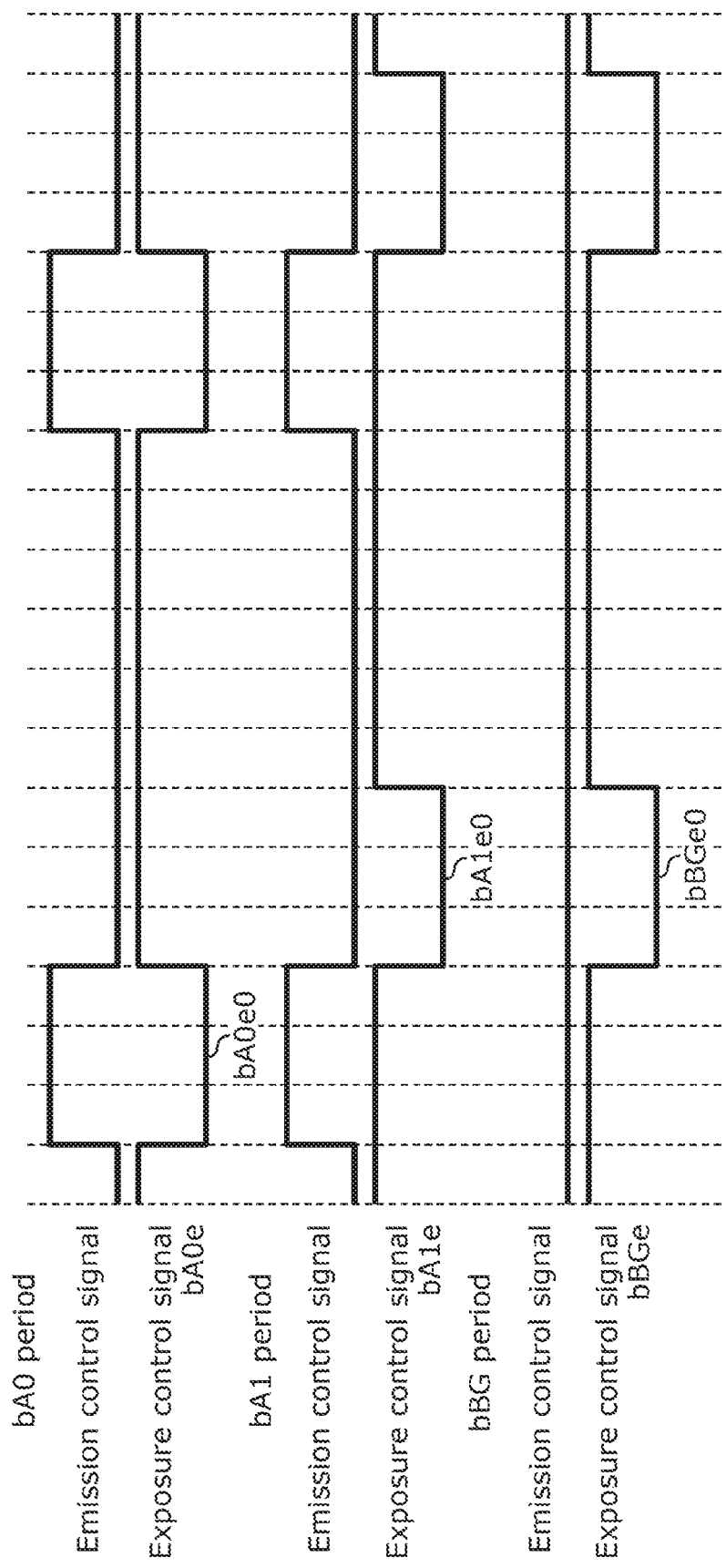
FIG. 8 is a diagram indicating, regarding Frame B, the signal waveforms of the emission control signal and the exposure control signal in FIG. 6A in a bA0 period, a bA1 period, and a bBG period according to Embodiment 2.

Next, FIG. 8 illustrates in detail parts of the outputs of the emission control signal and the exposure control signal in Frame B in the bA0 period, the bA1 period, and the bBG period in each of FIGS. 6A and 6B.

As the exposure control signal indicated in FIG. 8, exposure control signals bA0e, bA1e, and bBGe0 are output in 3-pattern phase relationships for the emission control signal. In the bA0 period and the bA1 period, one exposure control pulse is output for one emission control puke. The emission control signal in a BG period is always L (no emission).

Next, detection of multipath is described in detail.

Figure 9A:
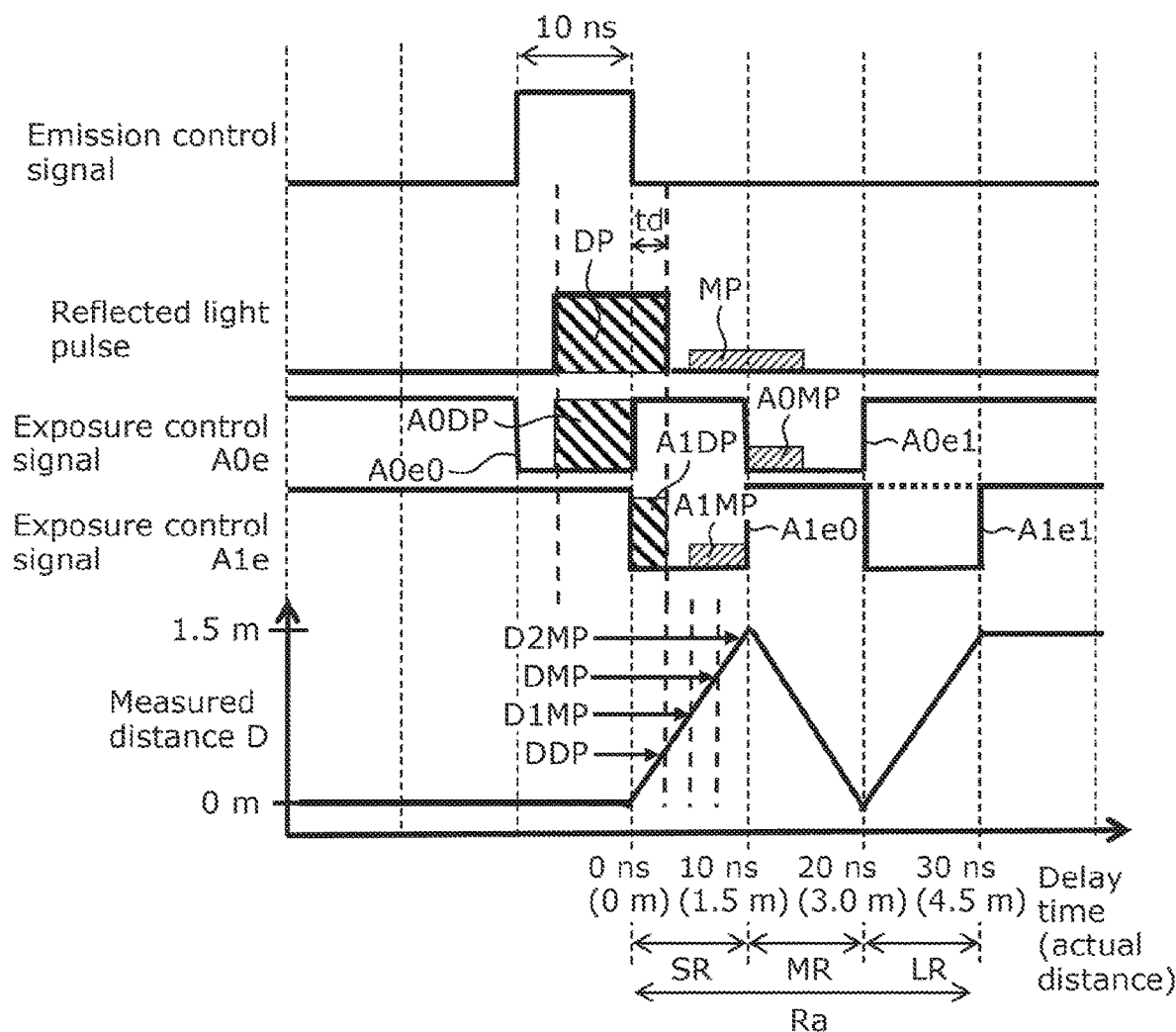
FIG. 9A is a diagram indicating, regarding Frame A in the distance-measuring imaging device according to Embodiment 2, (I) temporal relationships between (I-i) light directly reflected from a target object and light indirectly reflected from the target object and (I-ii) an A0 exposure control signal and an A1 exposure signal, and (II) relationships between actual distances and measured distances D.
Figure 9B:
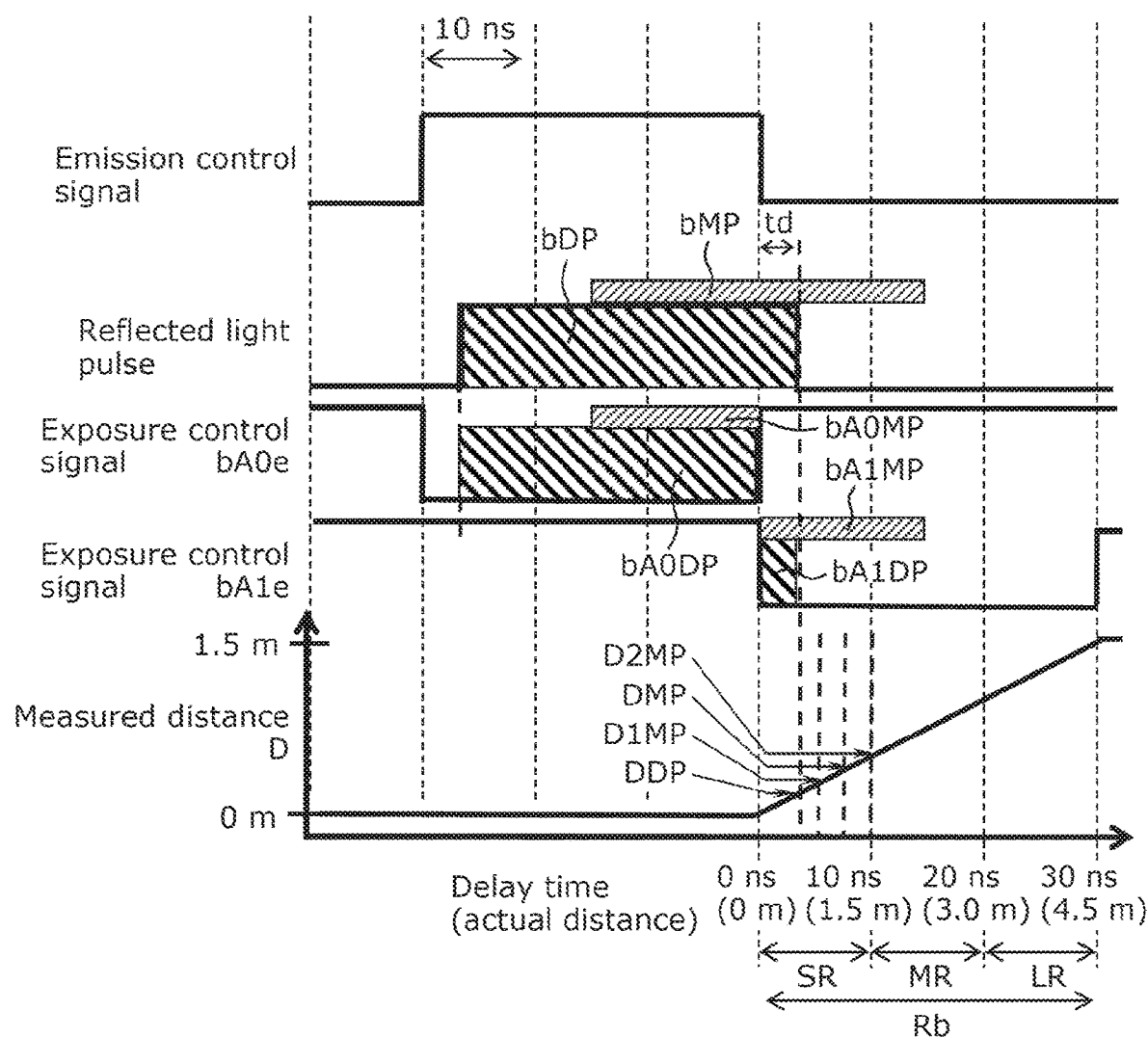
FIG. 9B is a diagram indicating, regarding Frame B in the distance-measuring imaging device according to Embodiment 2, (I) temporal relationships between (I-i) adjusted reflected light from a target object and indirectly reflected light from the target object and (I-ii) an A0 exposure control signal and an A1 exposure signal, and (II) relationships between actual distances and measured distances D.

Each of FIGS. 9A and 9B indicates a case in which a reflective object is present between light source 1 and target object, not only directly reflected light but also indirectly reflected light are emitted onto imager 2, and a multipath problem occurs. FIG. 9A is a diagram regarding Frame A and schematically indicates (I) temporal relationships between (I-i) puke DP of light directly reflected from the target object and pulse MP of indirectly reflected light and (i-ii) exposure control signals Age and A1e, and (II) relationships between actual distances and measured distances D. FIG. 96 is a diagram regarding Frame B and schematically indicates (I) temporal relationships between (I-i) puke bDP of light directly reflected from the target object and puke bMP of indirectly reflected light and (I-ii) exposure control signals bA0e and bA1e, and (II) relationships between actual distances and measured distances D. Distance DDP in the diagram indicates an actual distance of the target object in the case where the distance is measured based only on directly reflected light, Distance D1MP indicates an example of a distance measured in Frame A according to this embodiment when directly reflected light and indirectly reflected light are co-present. Distance DMP indicates an example of a distance measured according to the conventional techniques when directly reflected light and indirectly reflected light are co-present. Distance D2MP indicates an example of a distance measured in Frame B according to this embodiment when directly reflected light and indirectly reflected light are co-present.

The puke of light emitted from light source 1 branches to directly reflected light DP and directly reflected light bDP which are directly reflected on the target object and to indirectly reflected light MP and indirectly reflected light bMP which pass through the nearby reflective object and are reflected onto the target object. Directly reflected light DP and directly reflected light bDP and indirectly reflected light MP and indirectly reflected light bMP then enter imager 2. At this time, each of indirectly reflected light MP and indirectly reflected light bMP has time of flight longer than the time of flight of a corresponding one of directly reflected light DP and directly reflected light bDP by time corresponding to a corresponding one of the difference between the round-trip optical lengths of indirectly reflected light MP and directly reflected light DP and the difference between the round-trip optical lengths of indirectly reflected light bMP and directly reflected light bDP. Furthermore, since indirectly reflected light MP and indirectly reflected light bMP are diffusedly reflected plural times, the light strengths decrease.

In FIG. 9A, as for the pulse of directly reflected light DP and the puke of indirectly reflected light MP in Frame A, as in Embodiment 1, imager 2 measures exposure signal A0DP mainly by directly reflected light DP when first pulse A0e0 of exposure control signal A0e is at the low level (L), and measures exposure signal A0MP mainly by indirectly reflected light MP when second puke A0e1 of exposure control signal A0e is at L. Furthermore, imager 2 also measures exposure signal A1DP by directly reflected light DP and exposure signal A1MP by indirectly reflected light MP when first puke A1e0 of exposure control signal A1e is at L.

It is to be noted here that each of A0DP, A0MP, A1DP, and A1MP is the actual exposure signal obtained by subtraction of BG. Based on these exposure signals, measured distance D1MP per pixel in the case where multipath is present is output according to expression (A1DP+A1MP)/[(A0DP+A0MP)+(A1DP+A1MP)].

In FIG. 9B, as for the pulse of directly reflected light bDP and the puke of indirectly reflected light bMP in Frame B, as in Embodiment 1, imager 2 measures exposure signal bA0DP by directly reflected light bDP and exposure signal bA0MP by indirectly reflected light bMP when exposure control signal bA0e is at L. Furthermore, image 2 also measures exposure signal bA1DP by directly reflected light DP and exposure signal bA1MP by indirectly reflected light bMP when exposure control signal bA1e is at L.

It is to be noted here that each of bA0DP, bA0MP, bA1DP, and bA1MP is the actual exposure signal obtained by subtraction of BG. Based on these exposure signals, measured distance D2MP per pixel in the case where multipath is present is output according to expression (bA1DP+bA1MP)/[(bA0DP+bA0MP)+(bA1DP+bA1MP)]. Based on the relationships between the actual distances and measured distances D of each of Frame A and Frame B, measured distances D of each of the frames monotonically increase with respect to the actual distances in the range in which the lower limit value for the actual distances is approximately 0 m and the upper limit value for the actually measured values is approximately 1.5 m; but in the range in which the lower limit for the actual distances is from approximately 1.5 m to approximately 3 m, measured distances D of Frame A monotonically decrease with respect to the actual distances while measured distances D of Frame B monotonically increase with respect to the actual distances.

Here, when (i) a target object is present in the range in which the lower limit value for the actual distances is approximately 0 m and the upper limit value for the actually measured values is approximately 1.5 m and (ii) indirectly reflected light MP and indirectly reflected light bMP generated due to multipath enter imager 2 in each of the frames in a route of approximately 1.5 m (that is larger than or equal to the upper limit value for the actually measured values), measured distance D2MP of Frame B to be output is large, and measured distance D1MP of Frame A to be output is smaller than measured distance D2MP of Frame B.

It is possible to detect multipath components by subtracting measured distance D1MP of Frame A from measured distance D2MP of Frame B. In other words, as the value obtained according to expression (D2MP−D1MP) is larger, occurrence of larger multipath can be detected.

As described above, distance-measuring imaging device 10A according to Embodiment 2 is capable of detecting the magnitude of multipath components included per pixel when (i) a target object is present in the range in which the lower limit value for the actual distances is approximately 0 m and the upper limit value for the actually measured values is approximately 1.5 m and (H) indirectly reflected light MP and indirectly reflected light bMP generated due to multipath enter imager 2 in each of Frame A and Frame B in a route of approximately 1.5 m (that is larger than or equal to the upper limit value for the actually measured values). As in Embodiment 1, also in the distance measuring method according to Embodiment 2, at the same time as the time at which exposure signal A1MP by indirectly reflected light NIP is added to exposure signal A1DP by directly reflected light DP, exposure signal A0DP by indirectly reflected light MP is added to exposure signal A0DP by directly reflected light DR Addition of exposure signal A0MP to A0DP increases the denominator used to calculate measured distance D1MP and allows the target object to be observed closer than in measured distance DMP in the conventional example, which reduces error that is caused in the conventional distance measuring scheme that inevitably makes a target object observed far away due to multipath.

Figure 9C:
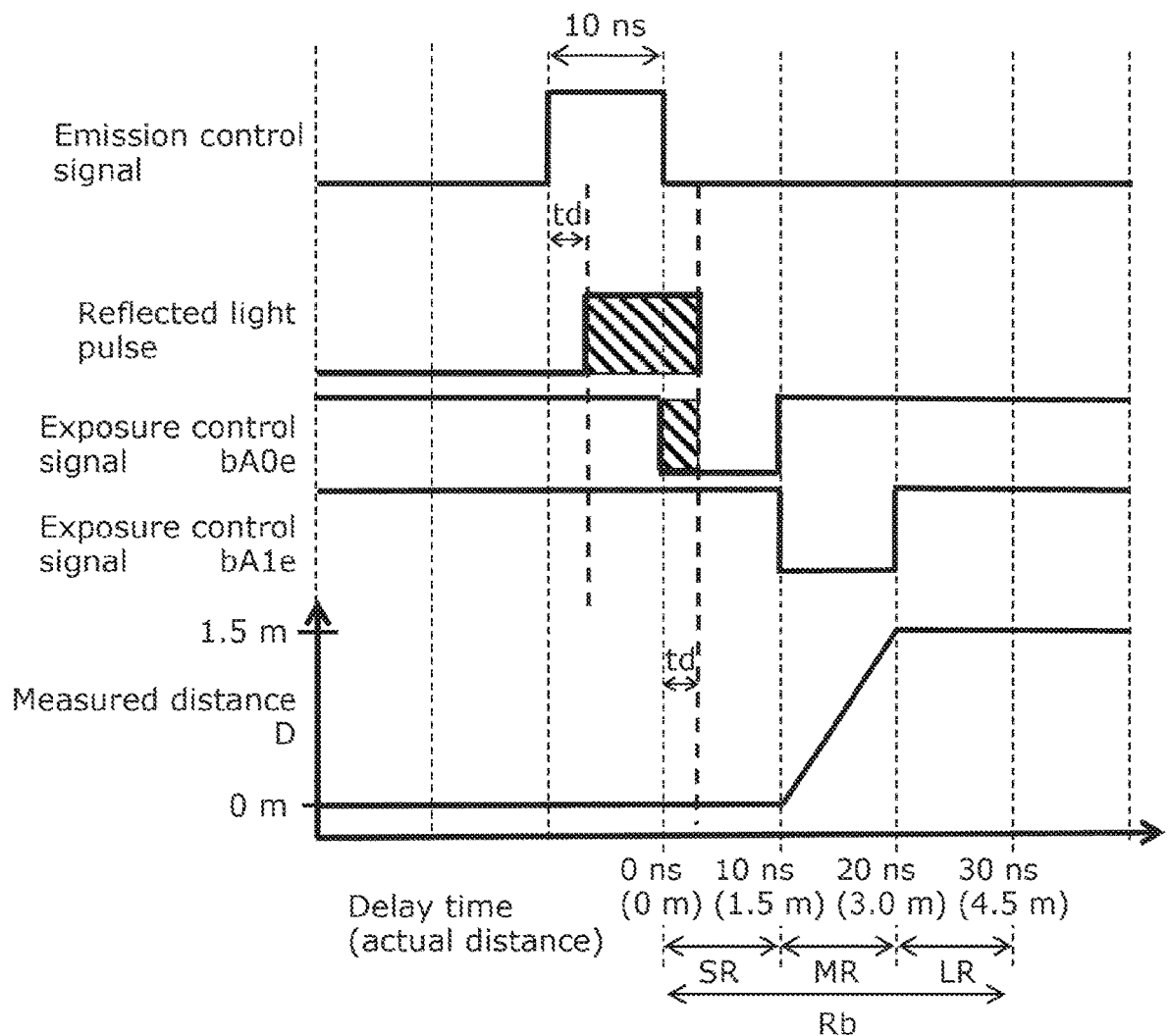
FIG. 9C is a diagram indicating, regarding Frame B in the distance-measuring imaging device according to Embodiment 2, (I) temporal relationships between (I-i) light directly reflected from a target object and light indirectly reflected from the target object and (I-ii) an A0 exposure control signal and an A1 exposure signal, and (II) relationships between actual distances and measured distances D.

Furthermore, composing the measured distance generated by distance-measuring drive of Frame A indicated in FIG. 9A and the measured distance generated by distance-measuring drive in each of FIGS. 9B and 9C makes it possible to measure the distances while reducing distance errors due to multipath even in the case of distances of approximately 1.5 m or longer. In other words, in Frame A indicated in FIG. 9A, measured distances D1MP monotonically increase from 0 to 1 in an actual distance range of approximately 0 to 1.5 m (a short distance range); measured distances D1MP monotonically decrease from 1 to 0 in an actual distance range of approximately 1.5 to 3.0 m (a middle distance range); and measured distances D1MP monotonically increase from 0 to 1 again in an actual distance range of approximately 3.0 to 4.5 m (a long distance range), It is impossible to determine which one of the short, middle, and long distance ranges includes the actual distance of the target object based only on measured distance D1MP obtained from Frame A (the problem to be solved is the same as in Embodiment 1). However, combining, in Frame B, measured distance D to the target object obtained by distance measuring drives in FIGS. 9B and 9C makes it possible to determine, in Frame B, the one of the short, middle, and long ranges which includes the actual distance range of the target object.

Although two kinds of frame (Frame A and Frame B) identification signals are output in Embodiment 2, it is to be noted that three or more kinds of frame identification signals may be output.

In Embodiment 2, the following numerical values are set: threshold value T of approximately 0.3 (threshold value T=approximately 0.3), specific coefficient La (La=approximately 1500), and specific coefficient Lb (Lb=approximately 4500). However, other optional numerical values may be set.

It is to be noted that frame composer 6 may multiply the measured distance in Frame A by coefficient La and multiply the measured distance in Frame B by coefficient Lb, average the multiplication results, and output the average as a distance image.

In addition, frame composer 6 may multiply the measured distance in Frame A by coefficient La and multiply the measured distance in Frame B by coefficient Lb, average the multiplication results, modify the ratio to be used for weighted average according to the measured distances, and output the result of the weighted average as a distance image.

Figure 10:
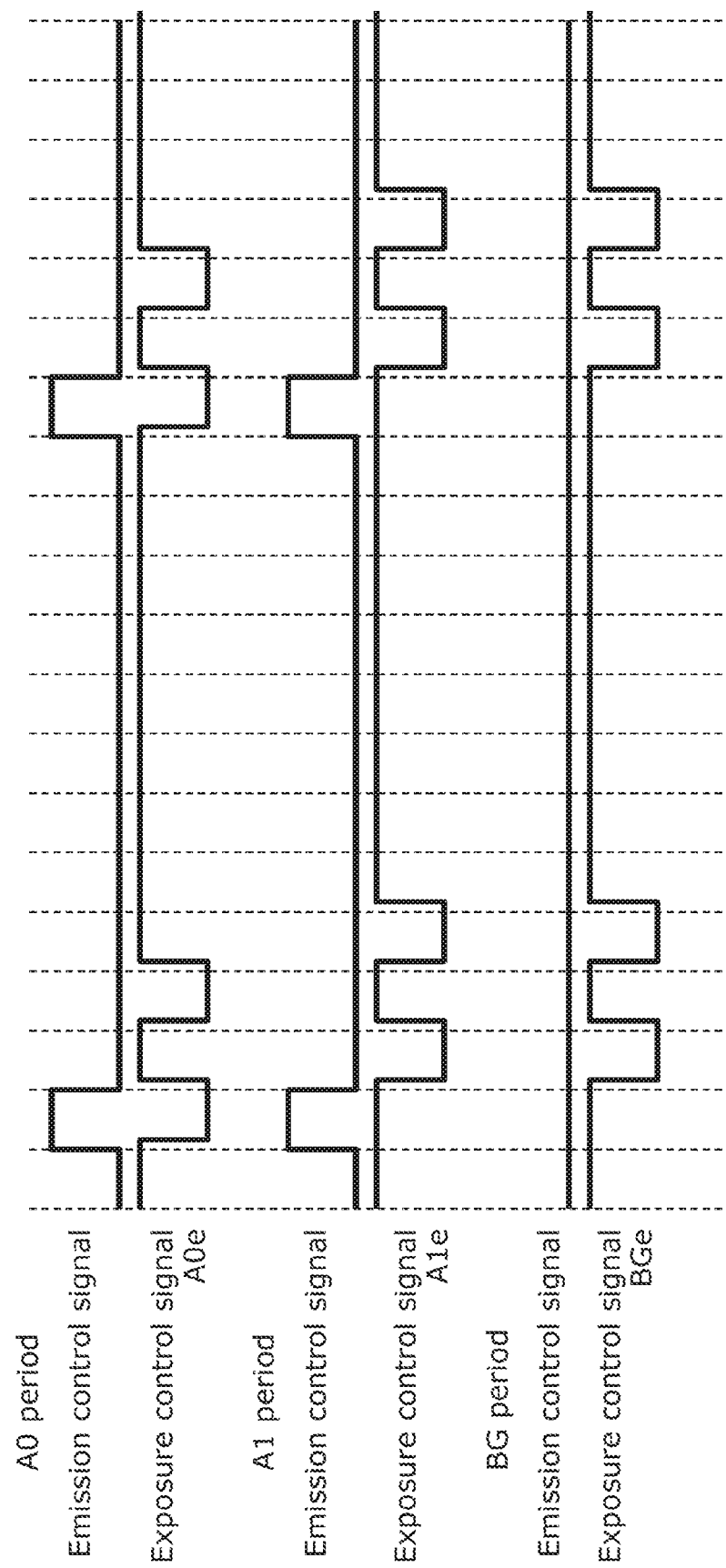
FIG. 10 is a timing chart indicating a drive performed by each of the distance-measuring imaging device according to Embodiment 1 and the distance-measuring imaging device according to Embodiment 2. The timing chart indicates outputs in an A0 period, an A1 period, and a BG period.

It is to be noted that, as indicated in FIG. 10, a frame other than Frame A, that is, a frame obtained by modifying only the phase difference between the emission control signal and the exposure control signal of Frame A may be used. In this case, modifying the phase difference makes it possible to slide the shortest distance and the longest distance which can be measured.

Figure 11:
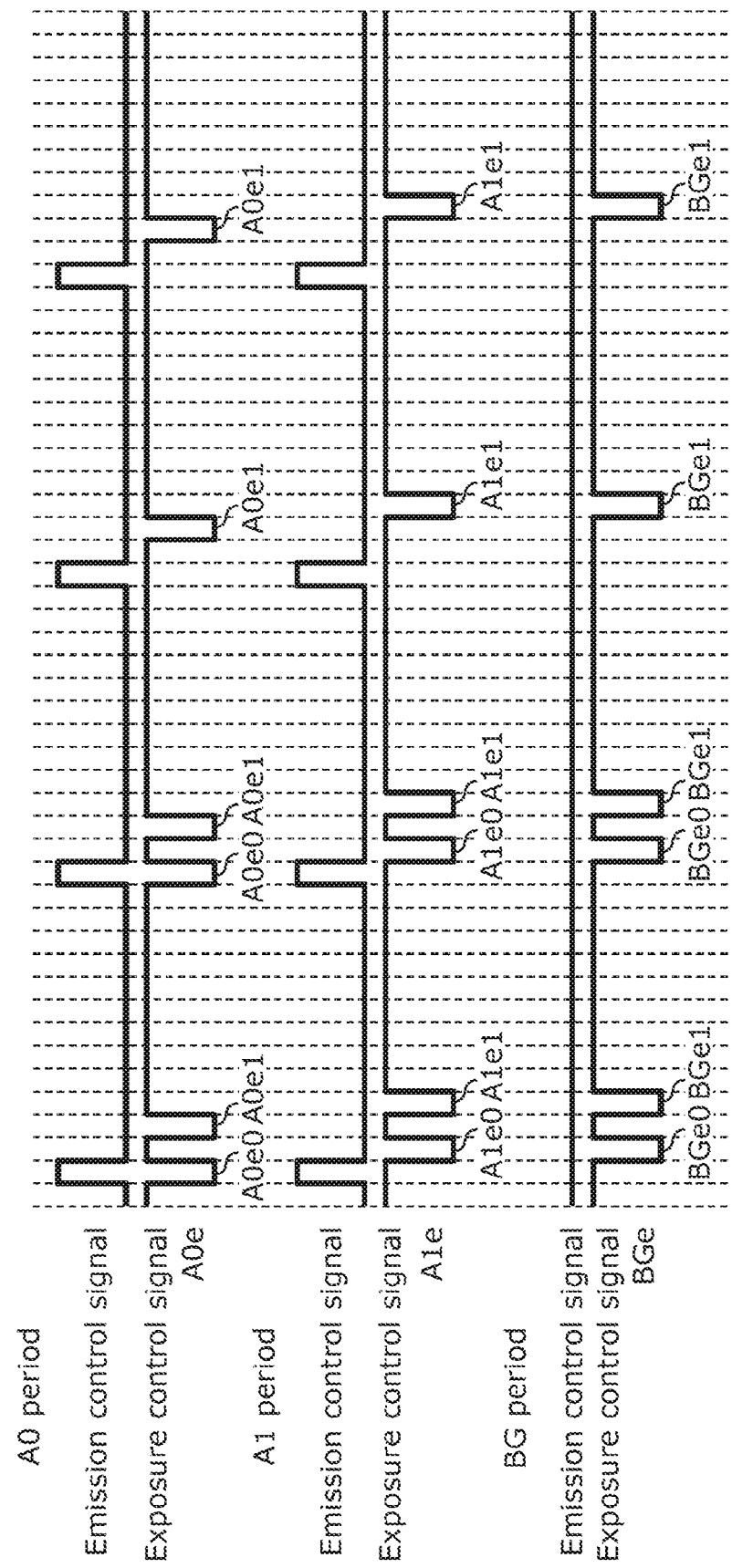
FIG. 11 is a timing chart indicating another drive performed by each of the distance-measuring imaging device according to Embodiment 1 and the distance-measuring imaging device according to Embodiment 2. The timing chart indicates other outputs in an A0 period, an A1 period, and a BG period.

As indicated in FIG. 11, it is to be noted that: for one emission control puke of Frame A, a corresponding one of pairs of exposure control pukes (A0$e$0 and A0$e$1, A1$e$0 and A1$e$1, and BG$e$0 and BG$e$1) may be present; and for one emission control puke of Frame A, a corresponding one of exposure control pulses (A0$e$1, A1$_{e1}$, and BG$e$1) may also be present. In this case, the number of times of exposure by exposure control pukes A0$e$1, A1$e$1, and BG$e$1 containing larger amount of information about multipath becomes larger, and thus the information about the multipath can be obtained at higher accuracy.

In addition, as indicated in FIG. 12, an exposure control pulse of one kind may be present for one emission control pulse of Frame A, and an exposure control pulse of another kind may also be present for one emission control pulse of Frame A. In this case, it is only necessary that one exposure control pulse be applied to the one emission control pulse. This reduces the load of drive controller 3 which generates exposure control pukes, which enables supply of sharper exposure control pulses and enables increase in distance measurement accuracy.

It is to be noted that, frame identification signals do not need to be switched on a per frame basis as indicated in FIG. 13A, and may be switched on a per pixel basis between an odd pixel and an even pixel as indicated in FIG. 13B or on a per line basis between an odd line and an even line.

It is to be noted that, as indicated in FIG. 14, it is also excellent that exposure signals A0, A1, and A2 are generated by exposure control signals A0$e$, A1$e$, and A2$e$, respectively, and A0 and A2 are added to obtain measured distance D.

It is to be noted that, as indicated in FIG. 15, it is also excellent that exposure signals A0, A1, A2, and A3 are generated by exposure control signals A0e, A1e, A2e, and A3e, respectively, and A2 is added to A0 and A3 is added to A1 to obtain measured distance D.

It is to be noted that FIG. 98 may narrow puke widths of the emission control signal and the exposure control signals in Frame B, delay exposure control pulses, and perform area determination about the short distance range, the middle distance range, and the long distance range of Frame A.

It is to be noted that k in FIG. 6A or FIG. 68 may be the same as or different from n. In addition, m in Frame A and m in Frame B in FIG. 6B may be the same value, but may be different values.

As decried with reference to the drawings, each of distance-measuring imaging device 10 according to Embodiment 1 and distance-measuring imaging device 10A according to Embodiment 2 is a distance-measuring imaging device which emits pulsed light, receives reflected light from a target object, and measures a distance to the target object. The distance-measuring imaging device includes: a drive controller which outputs (i) an emission control signal having one or more emission control pulses each of which instructs emission of light and (ii) one or more exposure control signals each having one or more exposure control pulses each of which instructs exposure; a light source which emits the pulsed light to coincide with an output timing of each of the one or more emission control pulses; an imager which executes exposure to receive reflected light resulting from the pulsed light emitted being reflected by the target object, to coincide with an output timing of each of the one or more exposure control pulses, and outputs a corresponding one of the one or more exposure signals each indicating an amount of signal charge generated through exposure; and a calculator which receives the exposure signal as an input, performs distance calculation, and outputs a distance image. The drive controller generates an exposure control signal which has a first exposure control pulse, a second exposure control pulse, and a third exposure control pulse which are included in the one or more exposure control pulses. Each of the first exposure control pulse, the second exposure control pulse, and the third exposure control pulse is based on the output timing of a corresponding emission control pulse as a reference and included in the one or more emission control pulses. A time difference between a point of time at which output of the third exposure control pulse is started and a point of time at which output of one of the one or more emission control pulses is started is greater than a time difference between a point of time at which output of the second exposure control pulse is started and a point of time at which output of one of the one or more emission control pulses is started. A time difference between a point of time at which output of the second exposure control pulse is started and a point of time at which output of one of the one or more emission control pulses is started is greater than a time difference between a point of time at which output of the first exposure control pulse is started and a point of time at which output of one of the one or more emission control pulses is started. The imager outputs a first exposure signal indicating an amount of signal charge generated through exposure by the first exposure control pulse, a second exposure signal indicating an amount of signal charge generated through exposure by the second exposure control pulse, and a third exposure signal indicating an amount of signal charge generated through exposure by the third exposure control pulse.

In this way, in a predefined distance-measuring range, the first exposure signal and the second exposure signal can mainly include signal charge corresponding to the indirectly reflected light, and the third exposure signal can mainly include signal charge corresponding to the indirectly reflected light. Thus, each of distance-measuring imaging device 10 and distance-measuring imaging device 10A is capable of reducing decrease in distance measurement accuracy in a multipath environment by calculating the distance using not only the first exposure signal and the second exposure signal but also the third exposure signal.

For example, the calculator may output distance information, based on a ratio of the amount of signal charge of the second exposure signal to a total of the amount of signal charge of the first exposure signal, the amount of signal charge of the second exposure signal, and the amount of signal charge of the third exposure signal.

In this way, it is possible to easily calculate the distance information with a reduced decrease in distance measurement accuracy, based on the ratio to the total.

For example, the drive controller may generate the first exposure control pulse and the third exposure control pulse, based on a common emission control pulse which is one of the one or more emission control pulses.

In this way, it is possible to obtain the first exposure signal and the third exposure signal by executing exposure twice per one-time light emission. At that time, it is possible to obtain signal charge of the indirectly reflected light using the third exposure signal.

For example, the drive controller may: generate the first exposure control pulse, based on a first emission control pulse included in the one or more emission control pulses; generate the second exposure control pulse, based on a second emission control pulse included in the one or more emission control pukes; and generate the third exposure control pulse, based on a third emission control puke included in the one or more emission control pulses.

In this way, it is possible to obtain the first exposure signal by executing exposure once per one-time light emission. Likewise, it is possible to obtain the second exposure signal by executing exposure once per one-time light emission. In addition, it is possible to obtain the third exposure signal by executing exposure once per one-time light emission. In this way, it is possible to obtain the first exposure signal, the second exposure signal, and the third exposure signal by performing simple control of executing exposure once per one-time light emission. The third exposure signal mainly includes signal charge corresponding to the indirectly reflected light, which makes it possible to reduce reduction in distance measurement accuracy in the multipath environment.

For example, the exposure control signal may have a fourth exposure control pulse. A time difference between a point of time at which output of the fourth exposure control pulse is started and a point of time at which output of an emission control pulse which is the reference and is included in the one or more emission control pulses is started may be greater than a time difference between a point of time at which output of the third exposure control pulse is started and a point of time at which output of an emission control pulse which is the reference and is included in the one or more emission control pulses is started. The drive controller may: generate the first exposure control pulse and the third exposure control pulse, based on a common emission control pulse which is one of the one or more emission control pulses; and generate the second exposure control pulse and the fourth exposure control pulse, based on a common emission control pulse which is one of the one or more emission control pulses.

In this way, it is possible to obtain the first exposure signal and the third exposure signal by executing exposure twice per one-time light emission. Likewise, it is possible to obtain the second exposure signal and a fourth exposure signal by executing exposure once per one-time light emission. The same control sequence of executing exposure twice per one-time light emission is used for the operation for obtaining the first exposure signal and the third exposure signal and also for the operation for obtaining the second exposure signal and the fourth exposure signal. Thus, in the above two operations, for example, no significant difference in variation of power supply voltage is caused. Therefore, it is possible to further reduce decrease in distance measurement accuracy.

For example, the calculator may output distance information, based on a ratio of a second total to a first total. The first total is a sum of the amount of signal charge of the first exposure signal, the amount of signal charge of the second exposure signal, the amount of signal charge of the third exposure signal, and an amount of signal charge of a fourth exposure signal, and the second total is a sum of the amount of signal charge of the second exposure signal and the amount of signal charge of the fourth exposure signal.

In this way, it is possible to obtain the distance information with a reduced decrease in distance measurement accuracy, using the first exposure signal, the second exposure signal, the third exposure signal, and the fourth exposure signal.

For example, the calculator may output distance information, based on a ratio of the amount of signal charge of the second exposure signal to a total of the amount of signal charge of the first exposure signal, the amount of signal charge of the second exposure signal, the amount of signal charge of the third exposure signal, and an amount of signal charge of a fourth exposure signal.

In this way, it is possible to use the amount of signal charge of the second exposure signal instead of a second total which is a sum of the amount of signal charge of the second exposure signal and the amount of signal charge of the fourth exposure signal. Also in this way, it is possible to obtain the distance information with a reduced decrease in distance measurement accuracy.

For example, the drive controller may: receive, as an input, an identification signal that specifies any one of a plurality of operation modes including a first operation mode and a second operation mode; control distance measurement by a first operation when the identification signal specifies the first operation mode, the first operation using the exposure control signal which has the first exposure control pulse, the second control pulse, and the third control pulse; and control distance measurement by a second operation different from the first operation when the identification signal specifies the second operation mode.

In this way, since the distance measurement is performed in each of the first operation mode and the second operation mode, it is possible to select distance information with a smaller measurement error.

For example, the distance-measuring imaging device may further include a distance image generator which: generate a multipath detection signal indicating whether multipath is present, based on first distance information obtained through the first operation and second distance information obtained through the second operation; and output the multipath detection signal indicating a magnitude of an error included in one of the first distance information and the second distance information, based on a difference between the first distance information and the second distance information.

In this way, it is possible to detect whether multipath is present or absent and detect the magnitude of an error due to multipath.

For example, the distance-measuring imaging device may further include a distance image generator which generates a multipath detection signal indicating whether multipath is present, based on first distance information obtained through the first operation and second distance information obtained through the second operation.

In this way, it is possible to detect whether multipath is present or absent.

For example, the distance-measuring imaging device may further include: a distance image generator which outputs a multipath detection signal indicating a magnitude of an error included in one of first distance information obtained through the first operation and second distance information obtained through the second operation, based on a difference between the first distance information and the second distance information.

In this way, it is possible to detect the magnitude of the error due to multipath.

For example, in the second operation mode, the drive controller may generate an exposure control signal which has a first pulse and a second pulse as the exposure control pulse. A time difference between a point of time at which output of the second pulse is started and a point of time at which output of one of the one or more emission control pulses is started may be greater than a time difference between a point of time at which output of the first pulse is started and a point of time at which output of the one of the one or more emission control pulses is started.

In this way, the second operation mode may be for, for example, a distance-measuring operation similar to the conventional distance-measuring operation.

For example, the imager may output a former exposure signal indicating an amount of signal charge generated through exposure by the first pulse and a latter exposure signal indicating an amount of signal charge generated through exposure by the second pulse.

In this way, in the second operation mode, it is possible to calculate the distance based on the former exposure signal and the latter exposure signal.

For example, the calculator may output distance information, based on a ratio of the amount of signal charge of the latter exposure signal to a total of the amount of signal charge of the former exposure signal and the amount of signal charge of the latter exposure signal.

In this way, in the second operation mode, the distance information is calculated based on the ratio. It is possible to derive the distance information with a reduced decrease in distance measurement accuracy by combining the second operation mode and the first operation mode.

For example, the distance-measuring imaging device may further include: a distance image generator which generates the distance image, based on a value obtained by adding a distance value indicated by first distance information obtained through the first operation and a distance value indicated by second distance information obtained through the second operation.

In this way, an average may be calculated based on the value obtained by adding the first distance information and the second distance information.

For example, the drive controller may execute exposure a plurality of times. The exposure may be for generating the first exposure control pulse and the third exposure control pulse based on a common emission control pulse which is one of the one or more emission control pulses. In addition, the drive controller may remove one of the first exposure pulse and the third exposure control pulse, a predetermined number of times in the exposure executed the plurality of times.

In this way, it is possible to increase the accuracy in the detection of multipath because a larger amount of indirectly reflected light is used for exposure when, for example, removing the first exposure control pulse, the predetermined number of times in the plurality of iterative operations of exposure executed twice per one-time light emission.

For example, the drive controller may execute first exposure a plurality of times. The first exposure may be for generating the first exposure control pulse and the third exposure control pulse based on a common emission control pulse which is one of the one or more emission control pulses. In addition, the drive controller may execute second exposure a plurality of times. The second exposure may be for generating the second exposure control pulse and the fourth exposure control pulse based on a common emission control pulse which is one of the one or more emission control pulses. In addition, the drive controller may remove one of the first exposure control pulse and the third exposure control pulse, a predetermined number of times in the first exposure executed the plurality of times, and remove one of the second exposure control pulse and the fourth exposure control pulse, a predetermined number of times in the second exposure executed the plurality of times.

In this way, it is possible to increase the distance measurement accuracy because the load of drive controller 3 which generates exposure control pulses is reduced when, for example, removing the first exposure control pulse and the second exposure control pulse, the predetermined numbers of times in the iterative operations of exposure executed twice per one-time light emission, and a steeper exposure control pulse is supplied.

For example, the drive controller may generate the emission control signal so that a duty ratio corresponding to an emitted-light pulse cycle becomes 33% or below.

In this way, it is possible to make the pulsed light to have a high strength to the background light, and to increase light resistance which is a distance measurement performance.

For example, the calculator may calculate distance information using a time-of-flight (TOF) principle, and outputs the distance information.

In this way, the distance information using the TOF principle is output.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The distance-measuring imaging device according to the present disclosure is applicable to cameras, for example.

The invention claimed is:

1. A distance-measuring imaging device which emits pulsed light, receives reflected light from a target object, and measures a distance to the target object, the distance-measuring imaging device comprising:
a drive controller which outputs (i) an emission control signal having one or more emission control pulses each of which instructs emission of light and (ii) one or more exposure control signals each having one or more exposure control pulses each of which instructs exposure;
a light source which emits the pulsed light to coincide with an output timing of each of the one or more emission control pulses;
an imager which executes exposure to receive reflected light resulting from the pulsed light emitted being reflected by the target object, to coincide with an output timing of each of the one or more exposure control pulses, and outputs a corresponding one of the one or more exposure signals each indicating an amount of signal charge generated through exposure; and
a calculator which receives the exposure signal as an input, performs distance calculation, and outputs a distance image,
wherein the drive controller generates an exposure control signal which has a first exposure control pulse, a second exposure control pulse, and a third exposure control pulse which are included in the one or more exposure control pulses, each of the first exposure control pulse, the second exposure control pulse, and the third exposure control pulse being based on the output timing of a corresponding emission control pulse as a reference and included in the one or more emission control pulses,
a time difference between a point of time at which output of the third exposure control pulse is started and a point of time at which output of one of the one or more emission control pulses is started is greater than a time difference between a point of time at which output of the second exposure control pulse is started and a point of time at which output of one of the one or more emission control pulses is started,
a time difference between a point of time at which output of the second exposure control pulse is started and a point of time at which output of one of the one or more emission control pulses is started is greater than a time difference between a point of time at which output of the first exposure control pulse is started and a point of time at which output of one of the one or more emission control pukes is started, and
the imager outputs a first exposure signal indicating an amount of signal charge generated through exposure by the first exposure control puke, a second exposure signal indicating an amount of signal charge generated through exposure by the second exposure control puke, and a third exposure signal indicating an amount of signal charge generated through exposure by the third exposure control pulse.

2. The distance-measuring imaging device according to claim 1,
wherein the calculator outputs distance information, based on a ratio of the amount of signal charge of the second exposure signal to a total of the amount of signal charge of the first exposure signal, the amount of signal charge of the second exposure signal, and the amount of signal charge of the third exposure signal.

3. The distance-measuring imaging device according to claim 2,
wherein the drive controller generates the first exposure control pulse and the third exposure control pulse, based on a common emission control pulse which is one of the one or more emission control pulses.

4. The distance-measuring imaging device according to claim 2,
wherein the drive controller:
generates the first exposure control pulse, based on a first emission control pulse included in the one or more emission control pulses;
generates the second exposure control pulse, based on a second emission control pulse included in the one or more emission control pulses; and
generates the third exposure control pulse, based on a third emission control pulse included in the one or more emission control pulses.

5. The distance-measuring imaging device according to claim 1,
wherein the exposure control signal has a fourth exposure control pulse,
a time difference between a point of time at which output of the fourth exposure control pulse is started and a point of time at which output of an emission control pulse which is the reference and is included in the one or more emission control pulses is started is greater than a time difference between a point of time at which output of the third exposure control pulse is started and a point of time at which output of an emission control pulse which is the reference and is included in the one or more emission control pulses is started, and
the drive controller:
generates the first exposure control pulse and the third exposure control pulse, based on a common emission control pulse which is one of the one or more emission control pulses; and
generates the second exposure control pulse and the fourth exposure control pulse, based on a common emission control pulse which is one of the one or more emission control pulses.

6. The distance-measuring imaging device according to claim 5,
wherein the calculator outputs distance information, based on a ratio of a second total to a first total, the first total being a sum of the amount of signal charge of the first exposure signal, the amount of signal charge of the second exposure signal, the amount of signal charge of the third exposure signal, and an amount of signal charge of a fourth exposure signal, the second total being a sum of the amount of signal charge of the second exposure signal and the amount of signal charge of the fourth exposure signal.

7. The distance-measuring imaging device according to claim 5,
wherein the calculator outputs distance information, based on a ratio of the amount of signal charge of the second exposure signal to a total of the amount of signal charge of the first exposure signal, the amount of signal charge of the second exposure signal, the amount of signal charge of the third exposure signal, and an amount of signal charge of a fourth exposure signal.

8. The distance-measuring imaging device according to claim 1,
wherein the drive controller:
receives, as an input, an identification signal that specifies any one of a plurality of operation nodes including a first operation mode and a second operation mode;
controls distance measurement by a first operation when the identification signal specifies the first operation mode, the first operation using the exposure control signal which has the first exposure control pulse, the second control pulse, and the third control pulse; and
controls distance measurement by a second operation different from the first operation when the identification signal specifies the second operation mode.

9. The distance-measuring imaging device according to claim 8, further comprising:
a distance image generator which:
generates a multipath detection signal indicating whether multipath is present, based on first distance information obtained through the first operation and second distance information obtained through the second operation; and
outputs the multipath detection signal indicating a magnitude of an error included in one of the first distance information and the second distance information, based on a difference between the first distance information and the second distance information.

10. The distance-measuring imaging device according to claim 8, further comprising:
a distance image generator which generates a multipath detection signal indicating whether multipath is present, based on first distance information obtained through the first operation and second distance information obtained through the second operation.

11. The distance-measuring imaging device according to claim 8, further comprising:
a distance image generator which outputs a multipath detection signal indicating a magnitude of an error included in one of first distance information obtained through the first operation and second distance information obtained through the second operation, based on a difference between the first distance information and the second distance information.

12. The distance-measuring imaging device according to claim 8,
wherein, in the second operation mode, the drive controller generates an exposure control signal which has a first pulse and a second pulse as the exposure control pulse, and
a time difference between a point of time at which output of the second pulse is started and a point of time at which output of one of the one or more emission control pulses is started is greater than a time difference between a point of time at which output of the first pulse is started and a point of time at which output of the one of the one or more emission control pulses is started.

13. The distance-measuring imaging device according to claim 12,
wherein the imager outputs a former exposure signal indicating an amount of signal charge generated through exposure by the first pulse and a latter exposure signal indicating an amount of signal charge generated through exposure by the second pulse.

14. The distance-measuring imaging device according to claim 13,
wherein the calculator outputs distance information, based on a ratio of the amount of signal charge of the latter exposure signal to a total of the amount of signal charge of the former exposure signal and the amount of signal charge of the latter exposure signal.

15. The distance-measuring imaging device according to claim 8, further comprising:
a distance image generator which generates the distance image, based on a value obtained by adding a distance value indicated by first distance information obtained through the first operation and a distance value indicated by second distance information obtained through the second operation.

16. The distance-measuring imaging device according to claim 3,
wherein the drive controller:
executes exposure a plurality of times, the exposure being for generating the first exposure control pulse and the third exposure control pulse based on a common emission control pulse which is one of the one or more emission control pulses; and
removes one of the first exposure pulse and the third exposure control pulse, a predetermined number of times in the exposure executed the plurality of times.

17. The distance-measuring imaging device according to claim 5,
wherein the drive controller:
executes first exposure a plurality of times, the first exposure being for generating the first exposure control puke and the third exposure control pulse based on a common emission control pulse which is one of the one or more emission control pulses;
executes second exposure a plurality of times, the second exposure being for generating the second exposure control puke and the fourth exposure control puke based on a common emission control puke which is one of the one or more emission control pukes; and
removes one of the first exposure control puke and the third exposure control puke, a predetermined number of times in the first exposure executed the plurality of times, and removes one of the second exposure control puke and the fourth exposure control pulse, a predetermined number of times in the second exposure executed the plurality of times.

18. The distance-measuring imaging device according to claim 1,
wherein the drive controller generates the emission control signal so that a duty ratio corresponding to an emitted-light pulse cycle becomes 33% or below.

19. The distance-measuring imaging device according to claim 1,
wherein the calculator calculates distance information using a time-of-flight (TOF) principle, and outputs the distance information.

* * * * *